(12) United States Patent
Kishimoto et al.

(10) Patent No.: US 11,899,493 B2
(45) Date of Patent: Feb. 13, 2024

(54) DIGITIZER AND ELECTRONIC APPARATUS INCLUDING THE SAME

(71) Applicant: Samsung Display Co., Ltd., Yongin-si (KR)

(72) Inventors: Hirotsugu Kishimoto, Hwaseong-si (KR); Sungguk An, Suwon-si (KR); Yongchan Jeon, Cheonan-si (KR); Chul Ho Jeong, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/983,753

(22) Filed: Nov. 9, 2022

(65) Prior Publication Data

US 2023/0236629 A1  Jul. 27, 2023

(30) Foreign Application Priority Data

Jan. 21, 2022 (KR) .......................... 10-2022-0009086

(51) Int. Cl.
*G06F 1/16* (2006.01)

(52) U.S. Cl.
CPC .......... *G06F 1/1618* (2013.01); *G06F 1/1643* (2013.01); *G06F 2200/1634* (2013.01)

(58) Field of Classification Search
CPC .................. G06F 1/1618; G06F 1/1643; G06F 2200/1634
See application file for complete search history.

(56) References Cited

U.S. PATENT DOCUMENTS

| 9,639,121 | B2 | 5/2017 | Min et al. |
| 10,976,873 | B2 | 4/2021 | Shin et al. |
| 2019/0036068 | A1* | 1/2019 | Kim ...................... G06F 1/1601 |
| 2019/0204867 | A1* | 7/2019 | Song ..................... G06F 1/1641 |
| 2020/0209998 | A1* | 7/2020 | Shin ...................... G06F 1/1641 |
| 2020/0225699 | A1* | 7/2020 | Yu ........................ H04M 1/0268 |
| 2021/0034180 | A1* | 2/2021 | Hirotsugu ............... G06F 3/046 |
| 2021/0271335 | A1* | 9/2021 | Kishimoto ............ G06F 1/1616 |
| 2021/0333934 | A1* | 10/2021 | Kishimoto ............. H10K 59/00 |

(Continued)

FOREIGN PATENT DOCUMENTS

| KR | 101687158 B1 | 12/2016 |
| KR | 102051803 B1 | 1/2020 |

(Continued)

*Primary Examiner* — Adrian S Wilson
(74) *Attorney, Agent, or Firm* — CANTOR COLBURN LLP

(57) ABSTRACT

An electronic apparatus includes: a display panel including a folding area foldable with respect to a folding axis, a panel protective layer disposed under the display panel, a digitizer disposed under the panel protective layer and including a base layer including a folding portion through which holes are defined, a first non-folding portion, and a second non-folding portion, and sensing coils disposed on the base layer, and an adhesive layer including a first portion attaching the panel protective layer to the first non-folding portion and a second portion spaced apart from the first portion with the folding portion interposed therebetween and attaching the panel protective layer to the second non-folding portion. The base layer includes a matrix portion including a filler and fiber lines arranged in the matrix portion and having a weave pattern.

30 Claims, 18 Drawing Sheets

(56) References Cited

U.S. PATENT DOCUMENTS

| | | | | |
|---|---|---|---|---|
| 2021/0400852 A1* | 12/2021 | Kim | ................... | H05K 7/20954 |
| 2022/0011889 A1* | 1/2022 | Shin | ........................ | G06F 3/041 |
| 2022/0043481 A1 | 2/2022 | Shin et al. | | |
| 2023/0215301 A1* | 7/2023 | Kishimoto | .............. | G06F 3/041 |
| | | | | 361/679.27 |
| 2023/0229194 A1* | 7/2023 | Kishimoto | ............ | G06F 1/1641 |
| | | | | 361/679.01 |
| 2023/0289021 A1* | 9/2023 | Jeon | ........................ | G06F 3/046 |
| | | | | 345/174 |

FOREIGN PATENT DOCUMENTS

| | | | |
|---|---|---|---|
| KR | 1020200084495 A | 7/2020 | |
| KR | 1020200124099 A | 11/2020 | |
| KR | 1020220049066 A | 4/2022 | |

* cited by examiner

DIGITIZER AND ELECTRONIC APPARATUS INCLUDING THE SAME

This application claims priority to Korean Patent Application No. 10-2022-0009086, filed on Jan. 21, 2022, and all the benefits accruing therefrom under 35 U.S.C. § 119, the content of which in its entirety is herein incorporated by reference.

BACKGROUND

1. Field of Disclosure

The present disclosure relates to an electronic apparatus including a digitizer. More particularly, the present disclosure relates to an electronic apparatus having improved folding characteristics.

2. Description of the Related Art

In the information society, an electronic apparatus is becoming increasingly important as media for transmission of visual information. The electronic apparatus is activated in response to electrical signals applied thereto. The electronic apparatus includes a digitizer that senses external inputs applied thereto from the outside of a display layer displaying images.

The digitizer of the electronic apparatus includes various sensing coils to be activated by the electrical signals. Areas in which the sensing coils are activated respond to the external signals.

SUMMARY

The present disclosure provides an electronic apparatus including a digitizer sensing an external input and having improved folding characteristics.

Embodiments of the invention provide an electronic apparatus including: a display panel including first and second non-folding areas arranged in a first direction and a folding area disposed between the first and second non-folding areas, where the folding area is foldable with respect to an imaginary folding axis extending in a second direction crossing the first direction; a panel protective layer disposed under the display panel; a digitizer disposed under the panel protective layer and including a base layer including a folding portion through which holes are defined to correspond to the folding area, a first non-folding portion, and a second non-folding portion spaced apart from the first non-folding portion with the folding portion interposed therebetween and sensing coils disposed on the base layer; and an adhesive layer including a first portion attaching the panel protective layer to the first non-folding portion and a second portion spaced apart from the first portion with the folding portion interposed therebetween and attaching the panel protective layer to the second non-folding portion. The base layer includes a matrix portion including a filler and fiber lines arranged in the matrix portion and having a weave pattern.

Portions of different sensing coils among the sensing coils may be provided between the holes adjacent to each other among the holes.

Sensing coils disposed in the first and second non-folding portions among the sensing coils may have a first line width equal to or greater than about 200 micrometers and equal to or smaller than about 400 micrometers, and sensing coils disposed in the folding portion among the sensing coils may have a second line width equal to or greater than about 30 micrometers and equal to or smaller than about 60 micrometers.

A first width in the first direction of each of the holes may be equal to or greater than about 0.1 mm and equal to or smaller than about 0.5 mm, and a second width in the second direction of each of the holes may be equal to or greater than about 4 mm and equal to or smaller than about 10 mm.

A first separation distance between holes adjacent to each other among the holes in the first direction may be equal to or greater than about 0.1 mm and equal to or smaller than about 0.3 mm, and a second separation distance between holes adjacent to each other among the holes in the second direction may be equal to or greater than about 0.1 mm and equal to or smaller than about 0.3 mm.

The sensing coils may include: first sensing coils including first long sides each extending in the first direction in the first and second non-folding portions and first short sides extending in the second direction and connected to first ends or second ends of the first long sides, and second sensing coils insulated from the first sensing coils and including second long sides each extending in the second direction in the first and second non-folding portions and second short sides extending in the first direction and connected to first ends or second ends of the second long sides.

A separation distance in the first and second non-folding portions in the second direction between two first long sides, which face each other among the first long sides of the first sensing coils and are disposed between two holes adjacent in the second direction among the holes, may be equal to or smaller than a half of a sum of a width in the second direction of each of the holes and a separation distance between the holes adjacent to each other in the second direction among the holes.

At least one of the first short sides may penetrate through the base layer to be connected to the first long sides.

A width in the first direction of the folding portion may be equal to or greater than about 5 mm and equal to or smaller than about 20 mm.

The holes may include a first hole group and a second hole group, which extend in the second direction and are arranged spaced apart from each other in the first direction, and the second hole group may be disposed shifted by a predetermined distance to the second direction from a position of the first hole group.

The shifted distance may be smaller than a half of a width in the second direction of each of the holes.

Each of the fiber lines may include a plurality of glass fibers, and each glass fiber may have a diameter equal to or greater than about 3 micrometers (μm) and equal to or smaller than about 10 μm.

The matrix portion may include at least one of epoxy, polyester, polyamides, poly carbonates, polypropylene, polybutylene, and vinyl ester.

The filler may include at least one of silica, barium sulphate, sintered talc, barium titanate, titanium oxide, clay, alumina, mica, boehmite, zinc borate, and zinc tinate.

Sensing coils disposed in the first and second non-folding portions among the sensing coils may have a first line width equal to or greater than about 200 micrometers and equal to or smaller than about 400 micrometers, and sensing coils disposed in the folding portion among the sensing coils may have a second line width equal to or greater than about 30 micrometers and equal to or smaller than about 60 micrometers.

The base layer may be provided in plural, and the base layers may be stacked in a thickness direction of the display panel.

The base layers may include an intermediate layer on which the sensing coils are disposed, an upper layer disposed on the intermediate layer, and a lower layer disposed under the intermediate layer, the digitizer may further include a bridge line disposed on at least one of the upper layer and the lower layer, and the bridge line may be connected to the sensing coils overlapping a place between holes adjacent to each other among the holes and overlapping therewith in a plan view after penetrating through one of the upper layer and the lower layer.

The digitizer may have a thickness equal to or greater than about 30 micrometers and equal to or smaller than about 300 micrometers.

The base layer may have a flexural modulus equal to or greater than about 10 gigapascals (Gpa) and equal to or smaller than about 50 GPa.

The electronic apparatus may further include insulating layers disposed on a front surface and a rear surface of the base layer, covering the sensing coils, and provided with openings defined therethrough to correspond to the holes.

The insulating layers may include at least one of a pigment and a dye, which have a black color.

Embodiments of the invention provide a digitizer including: a base layer including a folding portion through which holes are defined, a first non-folding portion, and a second non-folding portion spaced apart from the first non-folding portion with the folding portion interposed therebetween in a first direction, sensing coils disposed on the base layer, and insulating layers disposed on a front surface and a rear surface of the base layer, covering the sensing coils, and provided with openings defined therethrough to correspond to the holes. Portions of different sensing coils among the sensing coils are provided between two holes adjacent to each other among the holes.

The base layer may include: a matrix portion including a filler and fiber lines arranged in the matrix portion and having a weave pattern.

The digitizer may further include a shielding layer disposed under the base layer.

The sensing coils may include: first sensing coils including first long sides each extending in the first direction in the first and second non-folding portions and first short sides extending in a second direction and connected to first ends or second ends of the first long sides and second sensing coils insulated from the first sensing coils and including second long sides each extending in the second direction in the first and second non-folding portions and second short sides extending in the first direction and connected to first ends or second ends of the second long sides.

Each of the first sensing coils overlapping the folding portion may include first patterns extending in the second direction and spaced apart from each other with a corresponding opening interposed therebetween, a second pattern connecting first ends of the first patterns, and a third pattern connected to second ends of the first patterns opposite to the first ends.

The second pattern may be disposed between two holes adjacent to each other in the second direction among the holes, and the third pattern is disposed between two holes adjacent to each other and entirely overlapping each other in the first direction among the holes.

A first width in the first direction of each of the holes may be equal to or greater than about 0.1 mm and equal to or smaller than about 0.5 mm, and a second width in the second direction of each of the holes may be equal to or greater than about 4 mm and equal to or smaller than about 10 mm.

A first separation distance between holes adjacent to each other among the holes in the first direction may be equal to or greater than about 0.1 mm and equal to or smaller than about 0.3 mm, and a second separation distance between holes adjacent to each other among the holes in the second direction may be equal to or greater than about 0.1 mm and equal to or smaller than about 0.3 mm.

A width in the first direction of the folding portion may be equal to or greater than about 5 mm and equal to or smaller than about 20 mm.

Sensing coils disposed in the first and second non-folding portions among the sensing coils may have a first line width equal to or greater than about 200 micrometers and equal to or smaller than about 400 micrometers, and the sensing coils disposed in the folding portion among the sensing coils may have a second line width equal to or greater than about 30 micrometers and equal to or smaller than about 60 micrometers.

According to the above, the digitizer includes lines that cross between the holes defined in the folding portion, and thus, a sensing performance of the folding portion is effectively improved.

In addition, the digitizer included in the electronic apparatus serves as both a protective member and a sensing member. Accordingly, a separate metal plate to protect a display module is not required, and a separate digitizer for the folding portion is not necessary. Thus, the electronic apparatus having a slim thickness is provided with a reduced cost.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1A:
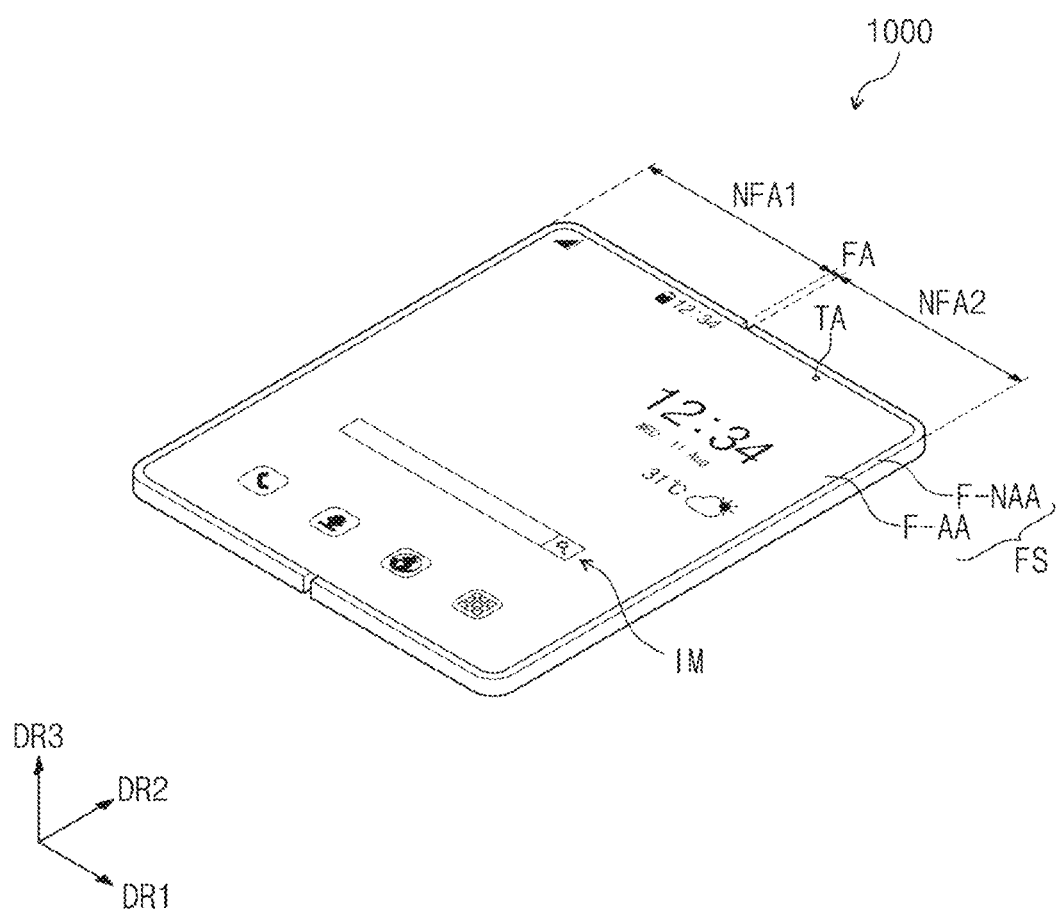
FIG. 1A is a perspective view of an electronic apparatus in an unfolded state according to an embodiment of the present disclosure.

In the present disclosure, it will be understood that when an element (or area, layer, or portion) is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content. As used herein, the term "and/or" may include any and all combinations of one or more of the associated listed items.

It will be understood that, although the terms "first", "second", etc. may be used herein to describe various elements, these elements should not be limited by these terms. These terms are only used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another elements or features as shown in the figures.

It will be further understood that the terms "include" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value. Hereinafter, embodiments of the present disclosure will be described with reference to accompanying drawings.

Figure 1B:
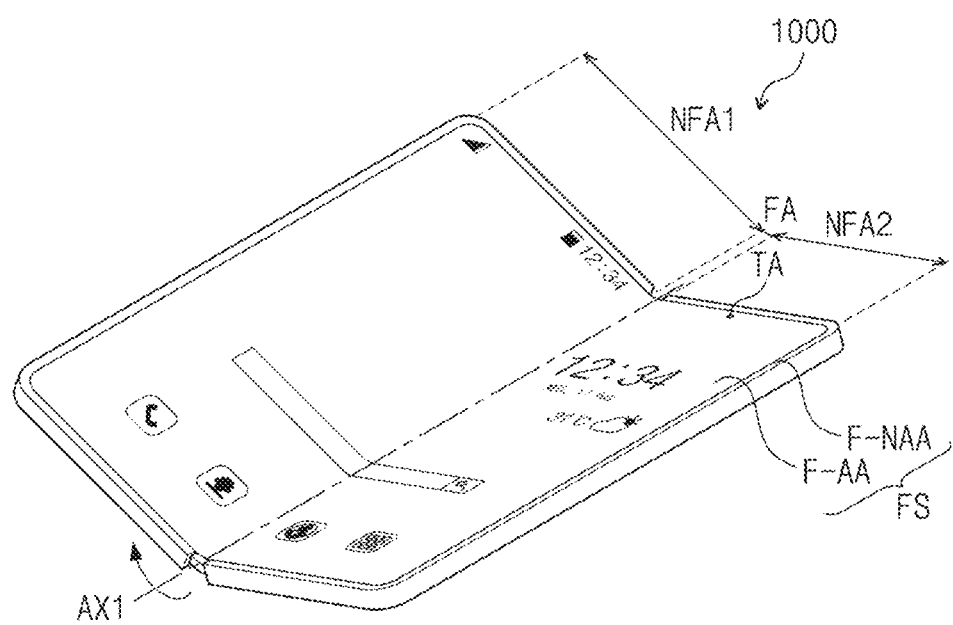
FIG. 1B is a perspective view of a folding operation of an electronic apparatus according to an embodiment of the present disclosure.
Figure 1C:
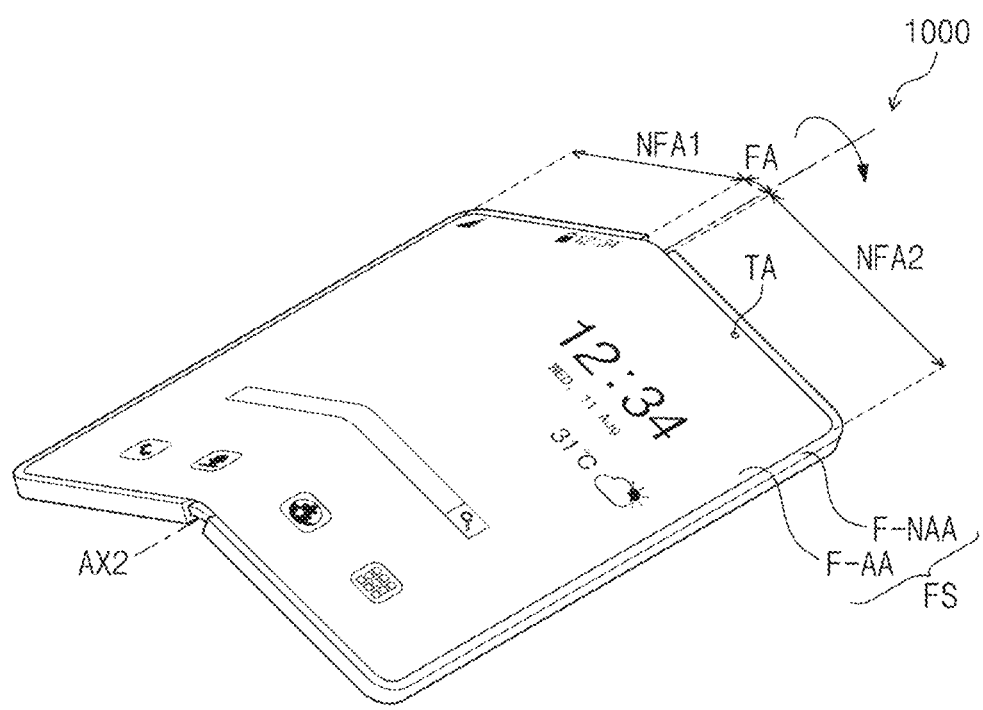
FIG. 1C is a perspective view of a folding operation of an electronic apparatus according to an embodiment of the present disclosure.
Figure 1D:
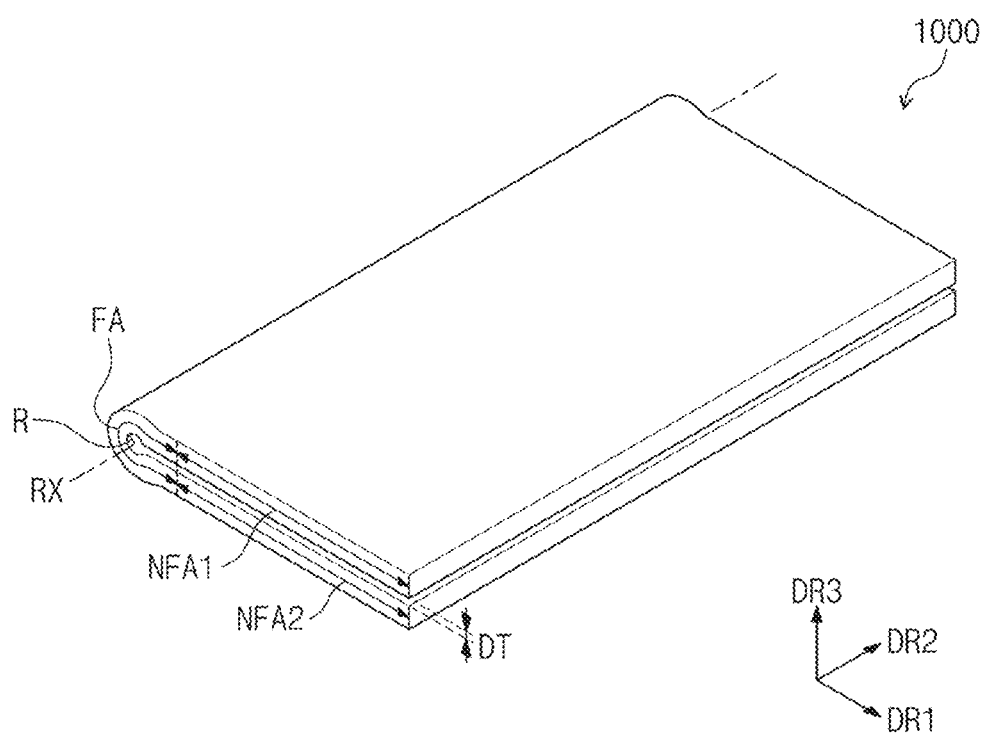
FIG. 1D is a perspective view of an electronic apparatus in a folded state according to an embodiment of the present disclosure.
Figure 1E:
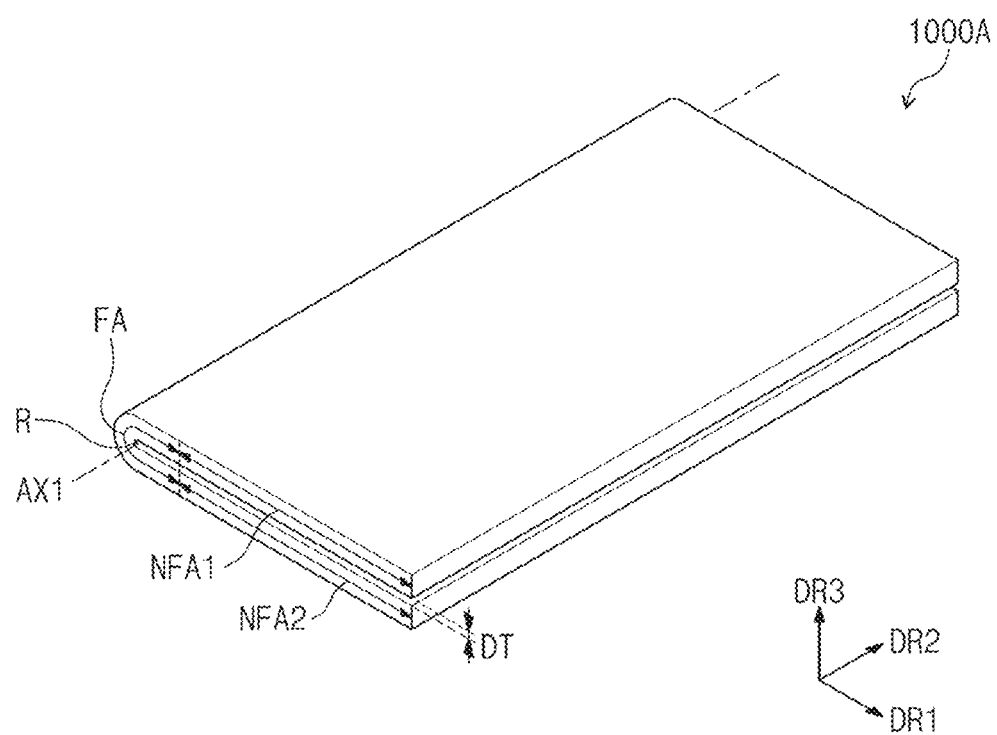
FIG. 1E is a perspective view of an electronic apparatus in a folded state according to an embodiment of the present disclosure.

FIG. 1A is a perspective view of an electronic apparatus 1000 in an unfolded state according to an embodiment of the present disclosure. FIG. 1B is a perspective view of a folding operation of the electronic apparatus 1000 according to an embodiment of the present disclosure. FIG. 1C is a perspective view of a folding operation of the electronic apparatus 1000 according to an embodiment of the present disclosure. FIG. 1D is a perspective view of the electronic apparatus 1000 in a folded state according to an embodiment of the present disclosure. FIG. 1E is a perspective view of an electronic apparatus 1000A in a folded state according to an embodiment of the present disclosure.

Referring to FIGS. 1A to 1D, the electronic apparatus 1000 may be an apparatus activated in response to electrical signals. The electronic apparatus 1000 may include various embodiments. For example, the electronic apparatus 1000 may include a tablet computer, a notebook computer, a computer, or a smart television. In the present embodiment, a smartphone will be described as the electronic apparatus 1000.

The electronic apparatus 1000 may display an image IM through a display surface FS that is substantially parallel to each of a first direction DR1 and a second direction DR2 toward a third direction DR3. The display surface FS through which the image IM is displayed may correspond to a front surface of the electronic apparatus 1000. The image IM may include a video and a still image. FIGS. 1A to 1C show an internet search box and a clock widget as an example of the image IM.

In the present embodiment, front (or upper) and rear (or lower) surfaces of each member of the electronic apparatus 1000 may be defined with respect to a direction in which the image IM is displayed in the unfolded state of the electronic apparatus 1000. The front and rear surfaces may be opposite to each other in the third direction DR3, and a normal line direction of each of the front and rear surfaces may be substantially parallel to the third direction DR3.

The electronic apparatus 1000 may sense an external input applied thereto from an outside. The external input may be a user input. The user input may include various inputs such as a signal generated by a part of a user's body or an electromagnetic pen, light, heat, or pressure, etc. When the electronic apparatus 1000 senses the input applied thereto by the electromagnetic pen, the electronic apparatus 1000 may further include a digitizer that is driven in an electromagnetic resonance ("EMR") method.

FIG. 1A shows the electronic apparatus 1000 in the unfolded state. The display surface FS of the electronic apparatus 1000 may include an active area F-AA and a peripheral area F-NAA. The peripheral area F-NAA may be defined adjacent to the active area F-AA. The peripheral area F-NAA may have a relatively low light transmittance compared to a light transmittance of the active area F-AA and may have a predetermined color.

According to the present embodiment, the peripheral area F-NAA may surround the active area F-AA. Accordingly, the active area F-AA may have a shape substantially defined by the peripheral area F-NAA, however, this is merely an example. According to an embodiment, the peripheral area F-NAA may be defined adjacent to only one side of the active area F-AA or may be omitted.

The display surface FS may further include a signal transmission area TA. The signal transmission area TA may be included in the active area F-AA, however, it should not be limited thereto or thereby. According to an embodiment, the signal transmission area TA may be included in the peripheral area F-NAA or may be surrounded by the active area F-AA and the peripheral area F-NAA.

The signal transmission area TA may have a light transmittance higher than a light transmittance of the active area F-AA and the peripheral area F-NAA. A natural light, a visible light, or an infrared light may travel through the signal transmission area TA.

The electronic apparatus 1000 may further include a sensor that takes a picture of an external object using the visible light traveling through the signal transmission area TA or that determines an approach of the external object using the infrared light traveling through the signal transmission area TA. The sensor may overlap the signal transmission area TA in a plan view. Accordingly, a reliability of the sensor employed in the electronic apparatus 1000 may be improved.

Referring to FIG. 1B, the electronic apparatus 1000 may be, but not limited to, a foldable electronic apparatus 1000. As an example, the electronic apparatus 1000 may be folded with respect to an imaginary first folding axis AX1 extending in the second direction DR2. The first folding axis AX1 may be defined on the display surface FS.

The electronic apparatus 1000 may include a folding area FA folded with respect to the first folding axis AX1, a first non-folding area NFA1, and a second non-folding area NFA2 spaced apart from the first non-folding area NFA1 with the folding area FA interposed therebetween in the first direction DR1.

The electronic apparatus 1000 may be folded in an in-folding manner with respect to the first folding axis AX1 such that the first non-folding area NFA1 may face the second non-folding area NFA2. In the present disclosure, a state where the electronic apparatus 1000 is unfolded may be defined as a first mode, and a state where the electronic apparatus 1000 is folded may be defined as a second mode.

Referring to FIG. 1C, the electronic apparatus 1000 may be folded in an out-folding manner with respect to a second folding axis AX2 such that the first non-folding area NFA1 may be opposite to the second non-folding area NFA2. The second folding axis AX2 may be defined on a surface opposite to the display surface FS.

The electronic apparatus 1000 may be operated only in the in-folding manner or only in the out-folding manner with respect to one of the folding axes that are collinearly extend. According to an embodiment, the electronic apparatus 1000 may be folded in either the in-folding manner or the out-folding manner with respect to one folding axis.

Referring to FIG. 1D, when the electronic apparatus 1000 is inwardly folded (in-folding), at least a portion of the folding area FA may have a predetermined curvature. The folding area FA may have a center of curvature RX defined therein, and the electronic apparatus 1000 may be folded at a predetermined radius of curvature R with respect to the center of curvature RX. According to an embodiment, the radius of curvature R may be greater than a distance DT between the first non-folding area NFA1 and the second non-folding area NFA2.

Referring to FIG. 1E, the electronic apparatus 1000A may be folded at a predetermined radius of curvature R when being inwardly folded. In this case, a distance DT between a portion extending from the folding area FA to the first non-folding area NFA1 and a portion extending from the folding area FA to the second non-folding area NFA2 may be uniform along the first direction DR1, however, it should not be particularly limited.

Figure 2:
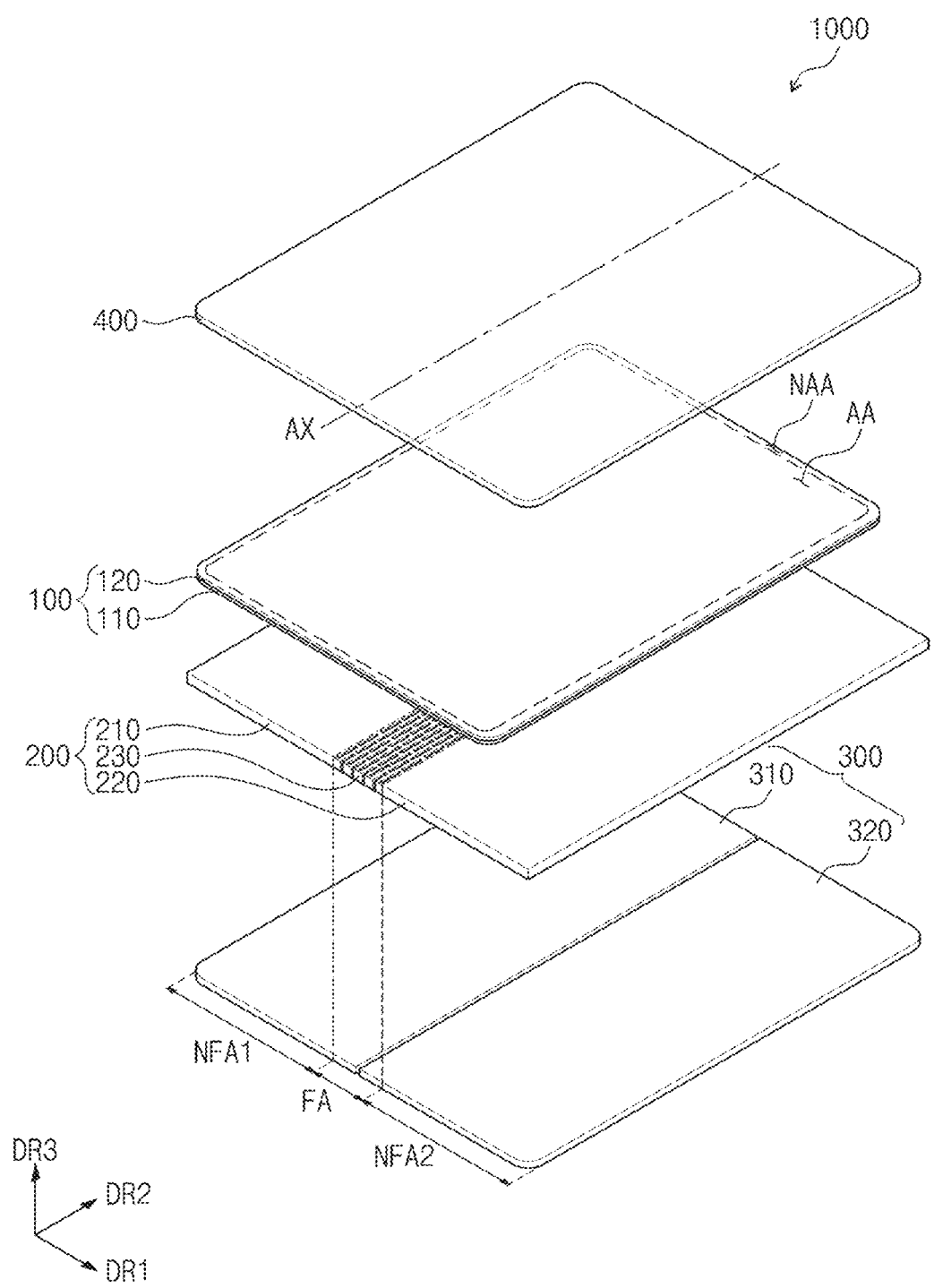
FIG. 2 is an exploded perspective view of an electronic apparatus according to an embodiment of the present disclosure.
Figure 3:
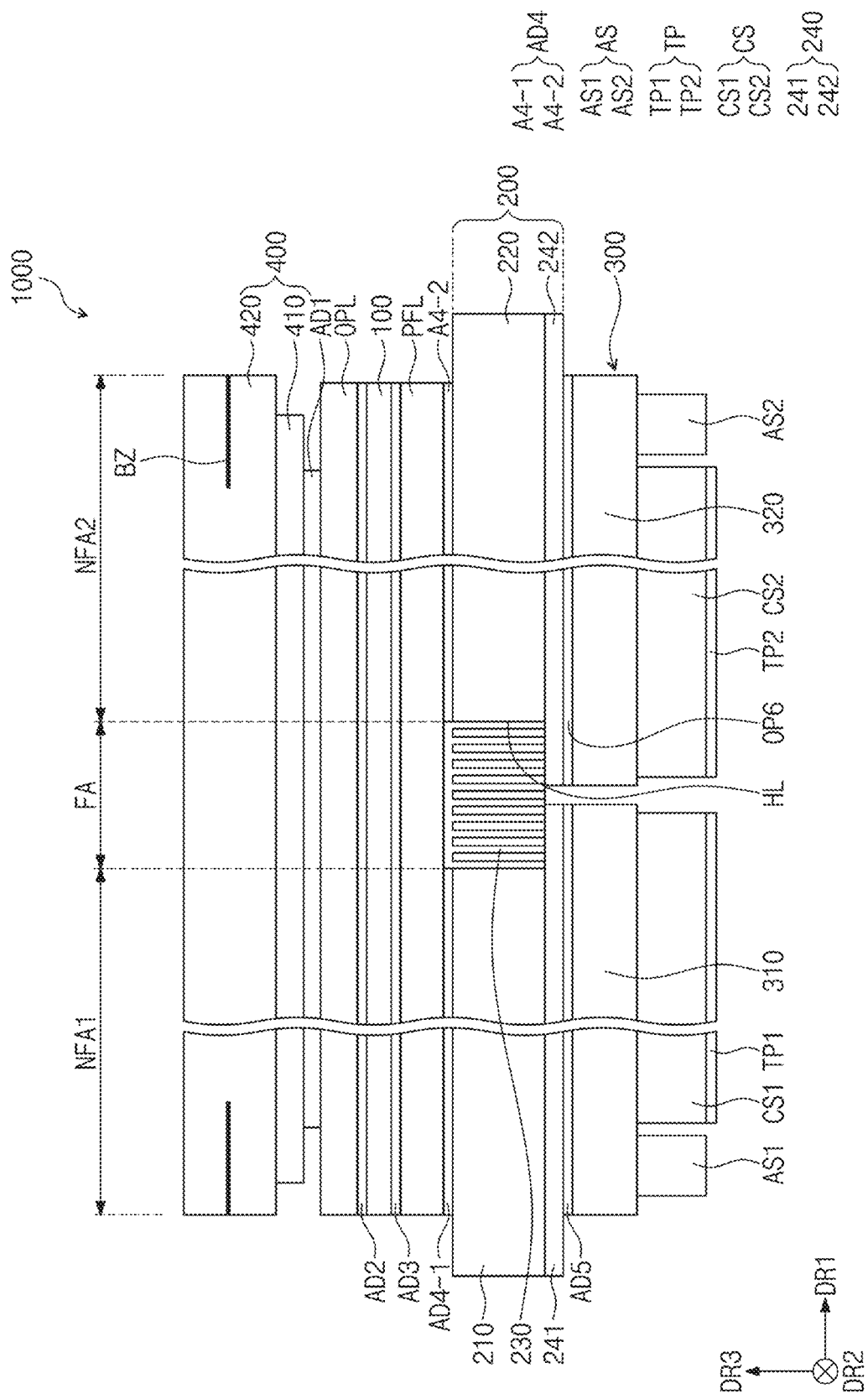
FIG. 3 is a cross-sectional view of an electronic apparatus according to an embodiment of the present disclosure.

FIG. 2 is an exploded perspective view of an electronic apparatus 1000 according to an embodiment of the present disclosure. FIG. 3 is a cross-sectional view of the electronic apparatus 1000 according to an embodiment of the present disclosure. FIG. 2 shows only some components included in the electronic apparatus 1000.

Referring to FIGS. 2 and 3, the electronic apparatus 1000 may include a display module 100, a digitizer 200, a cushion layer 300, and a window 400. In more detail, the electronic apparatus 1000 may include a plurality of adhesive layers AD1 to AD5, upper functional layers disposed between the display module 100 and the window 400, and lower functional layers disposed under the digitizer 200 as shown in FIG. 3.

The adhesive layers AD1 to AD5 described hereinafter may include one of an optical clear adhesive ("OCA"), an optical clear resin ("OCR"), and a pressure sensitive adhesive ("PSA").

The display module 100 may be flexible. The display module 100 may include an active area AA corresponding to the active area F-AA of the electronic apparatus 1000 shown in FIG. 1A and a peripheral area NAA corresponding to the peripheral area F-NAA of the electronic apparatus 1000 shown in FIG. 1A.

The display module 100 may include a display panel 110 displaying an image and an input sensor 120 sensing an external input. The display panel 110 may be a light emitting type display panel 110, however, it should not be particularly limited. For instance, the display panel 110 may be an organic light emitting display panel 110 or an inorganic light emitting display panel 110. A light emitting element of the organic light emitting display panel 110 may include an organic light emitting material. A light emitting element of the inorganic light emitting display panel 110 may include a quantum dot or a quantum rod. In addition, the display panel 110 may include a micro-LED element and/or a nano-LED element, however, it should not be particularly limited.

The display panel 110 may include a plurality of pixels each of which includes one of the light emitting elements. Light emitting layers respectively included in the light emitting elements may be disposed in the active area AA and may emit predetermined colors. When the light emitting layer is provided in plural, the light emitting elements may correspond to the light emitting layers, respectively. When the light emitting layer is provided as a single layer, the display panel 110 may further include color filters or color conversion members disposed on the light emitting layer. Conductive patterns used to drive the light emitting elements may be disposed in the peripheral area NAA.

The input sensor 120 may be disposed on the display panel 110. The input sensor 120 may be driven in a capacitive method. The input sensor 120 may sense a position where a user's hand touches and/or an intensity of a signal generated by the user's hand over an entire area of the active area F-AA. The input sensor 120 may include sensing electrodes insulated from each other, routing lines connected to corresponding sensing electrodes, and at least one sensing insulating layer.

The input sensor 120 may be formed on the display panel 110 through successive processes. In this case, the input sensor 120 may be described as being disposed directly on the display panel 110. In the present disclosure, the expression "the input sensor 120 is disposed directly on the display panel 110" means that no intervening elements are present between the input sensor 120 and the display panel 110. That is, a separate adhesive member may not be disposed between the input sensor 120 and the display panel 110.

However, the present disclosure should not be limited thereto or thereby. According to an embodiment, the input sensor 120 may be provided as a separate module and may be combined with the display panel 110 by an adhesive layer.

The digitizer 200 may be disposed under the display module 100. The digitizer 200 may sense the input generated by the electromagnetic pen. In this case, the digitizer 200 may be driven in an electromagnetic resonance (EMR) method.

The digitizer 200 may sense the input generated by the electromagnetic pen while being disposed under the display module 100 to support the display module 100. The digitizer 200 may include a first non-folding portion 210, a second non-folding portion 220, and a folding portion 230. In addition, the digitizer 200 may further include a shielding layer 240.

The first non-folding portion 210 may overlap at least a portion of the first non-folding area NFA1 in a plan view. The second non-folding portion 220 may overlap at least a portion of the second non-folding area NFA2. The folding portion 230 may overlap the folding area FA. Accordingly, the folding portion 230 may be disposed between the first non-folding portion 210 and the second non-folding portion 220.

A width in the first direction DR1 of the folding portion 230 may be equal to or greater than about 5 millimeters (mm) and equal to or smaller than about 20 mm.

Holes HL may be defined through the folding portion 230 of the digitizer 200 from a front surface of the folding portion 230 to a rear surface of the folding portion 230 along the third direction DR3. The holes HL may overlap the folding area FA in a plan view, and the holes HL may be spaced apart from each other in the first direction DR1 and the second direction DR2.

The shielding layer 240 may include a first shielding layer 241 and a second shielding layer 242. The first shielding layer 241 may overlap a portion of the folding portion 230 and the first non-folding portion 210, and the second shielding layer 242 may overlap another portion of the folding portion 230 and the second non-folding portion 220 in a plan view. The first shielding layer 241 and the second shielding layer 242 may be spaced apart from each other in the folding area FA along the first direction DR1, however, they should not be limited thereto or thereby. According to an embodiment, the shielding layer 240 may be disposed in the entire area of the folding area FA and may cover the holes HL.

The shielding layer 240 may include a metal material. For example, the shielding layer 240 may include a magnetic metal powder ("MMP"), however, a material for the shielding layer 240 should not be limited thereto or thereby. According to an embodiment, the shielding layer 240 may include a permalloy, which is an alloy of nickel (Ni) and iron (Fe), an invar, or a stainless steel.

According to the present disclosure, when the electronic apparatus 1000 performs the folding operation in which the first mode and the second mode are alternately continued the display module 100 whose shape is changed may be supported by the digitizer 200, and the shape of the display module 100 may be changed to correspond to a shape of the digitizer 200.

The digitizer 200 may include sensing coils and one or more base layers (See FIG. 7A) on which the sensing coils are disposed. Each of the base layers may include a matrix portion and a fiber reinforced composite material provided in the matrix portion. A reinforced fiber may include one of a carbon fiber and a glass fiber. The matrix portion may include a thermoplastic polymer resin.

The digitizer 200 may have a function of a protective member to protect the display module 100 and a function of a sensing member to sense the input by the electromagnetic pen. The functions of the protective member and the sensing member will be described later.

The cushion layer 300 may be disposed under the digitizer 200. The cushion layer 300 may protect the display module 100 from impacts applied from a lower side of the cushion layer 300. The cushion layer 300 may include a foam or a sponge. The foam may include a polyurethane foam or a thermoplastic polyurethane foam. When the cushion layer 300 includes the foam, the cushion layer 300 may include a barrier film as its base layer, and the cushion layer 300 may be formed by providing a foaming agent on the barrier film.

The cushion layer 300 may include a first cushion layer 310 and a second cushion layer 320. The first cushion layer 310 may overlap a portion of the folding portion 230 and the first non-folding portion 210 in a plan view. The second cushion layer 320 may overlap another portion of the folding portion 230 and the second non-folding portion 220. The first cushion layer 310 and the second cushion layer 320 may be spaced apart from each other in the folding area FA along the first direction DR1.

When the electronic apparatus 1000 is operated in the first mode, the first cushion layer 310 and the second cushion layer 320 may prevent a foreign substance from entering the holes HL defined through the folding portion 230. When the electronic apparatus 1000 is operated in the second mode, the first cushion layer 310 and the second cushion layer 320 may be spaced apart from each other in an area overlapping the folding portion 230 in a plan view even though the folding portion 230 is folded with a predetermined curvature, and thus, the shape of the digitizer 200 may be easily changed.

The window 400 may be disposed on the display module 100. The window 400 may include a first layer 410, a second layer 420, and a bezel pattern BZ. The window 400 may include an optically transparent material through which a light provided from the display module 100 transmits. The window 400 may provide the display surface FS (refer to FIG. 1A) of the electronic apparatus 1000.

The window 400 may include a flexible material. Accordingly, the window 400 may be folded or unfolded with respect to a folding axis AX. That is, the shape of the window 400 may be changed to correspond to the shape of the digitizer 200 according to the operations of the first mode and the second mode.

The first layer 410 may include a thin film glass or a synthetic resin film. When the first layer 410 includes the thin film glass, the first layer 410 may have a thickness equal to or smaller than about 100 µm. As an example, the first layer 410 may have a thickness of about 30 µm, however, the thickness of the first layer 410 should not be limited thereto or thereby.

When the first layer 410 includes the synthetic resin film, the first layer 410 may include a polyimide ("PI") film or a polyethylene terephthalate ("PET") film.

The first layer 410 may have a single-layer or multi-layer structure. As an example, the first layer 410 may include a plurality of synthetic resin films coupled to each other by an adhesive or may include a glass substrate and a synthetic resin film coupled to the glass substrate by an adhesive.

The second layer 420 may be disposed on the first layer 410. The second layer 420 may include a material having a relatively low modulus compared to a modulus of the first layer 410. As an example, the second layer 420 may be a film including an organic material. The second layer 420 may have a relatively great thickness compared to a thickness of the first layer 410. Accordingly, the second layer 420 may protect an upper surface of the first layer 410.

The second layer 420 may include at least one functional layer. The functional layer may include at least one of a window protective layer, an anti-fingerprint layer, and an anti-reflective layer.

The window 400 may transmit the image from the display module 100 and alleviate the external impacts, thereby preventing the display module 100 from being damaged or malfunctioning due to the external impacts.

An optical layer OPL may be disposed between the display module 100 and the window 400. The optical layer OPL may be coupled to the window 400 by a first adhesive layer AD1, and the optical layer OPL may be coupled to the display module 100 by a second adhesive layer AD2.

The optical layer OPL may reduce a reflectance with respect to an external light. The optical layer OPL may include a stretch-type synthetic resin film. As an example, the optical layer OPL may be formed by adsorbing iodine compound on a polyvinyl alcohol ("PVA") film. According to an embodiment, the optical layer OPL may include a color filter. The optical layer OPL may include a variety of layers as long as the optical layer OPL reduces the reflectance with respect to the external light, and it should not be particularly limited.

A panel protective layer PFL may be disposed between the display module 100 and the digitizer 200. The panel protective layer PFL and the display module 100 may be coupled to each other by a third adhesive layer AD3. The panel protective layer PFL may be disposed under the display module 100 and may protect a lower portion of the display module 100. The panel protective layer PFL may include a flexible plastic material. As an example, the panel protective layer PFL may include polyethylene terephthalate.

The digitizer 200 and the panel protective layer PFL may be coupled to each other by a fourth adhesive layer AD4. The fourth adhesive layer AD4 may include a first portion AD4-1 and a second portion AD4-2. The first portion AD4-1 and the second portion AD4-2 may be spaced apart from each other with the folding area FA interposed therebetween.

A portion of the first non-folding portion 210 may be coupled to a portion of the panel protective layer PFL by the first portion AD4-1, and a portion of the second non-folding portion 220 may be coupled to another portion of the panel protective layer PFL by the second portion AD4-2.

The cushion layer 300 may include a first cushion layer 310 and a second cushion layer 320. The first cushion layer 310 may be coupled to the first shielding layer 241 by a portion of the fifth adhesive layer AD5, and the second cushion layer 320 may be coupled to the second shielding layer 242 by the other portion of the fifth adhesive layer AD5.

The electronic apparatus 1000 may further include a metal plate CS, an insulating layer TP, and a step difference compensation member AS, which are disposed under the cushion layer 300. The metal plate CS may absorb the external impacts and may protect the display module 100. The metal plate CS may include a stainless steel. The metal plate CS may include a first metal layer CS1 and a second metal layer CS2. The first metal layer CS1 may be coupled to the first cushion layer 310 by a portion of an adhesive layer, and the second metal layer CS2 may be coupled to the second cushion layer 320 by the other portion of the adhesive layer.

The insulating layer TP may be disposed under the metal plate CS. The insulating layer TP may prevent a static electricity from entering the metal plate CS. The insulating layer TP may be an insulating film. The insulating layer TP may include a first insulating layer TP1 and a second insulating layer TP2, and the first insulating layer TP1 and the second insulating layer TP2 may be respectively coupled to the first metal layer CS1 and the second metal layer CS2.

The step difference compensation member AS may be coupled to a lower portion of the cushion layer 300. The step difference compensation member AS may be a double-sided tape or an insulating film. The step difference compensation member AS may include a first step difference compensation member AS1 and a second step difference compensation member AS2, and the first step difference compensation member AS1 and the second step difference compensation member AS2 may be respectively coupled to the first cushion layer 310 and the second cushion layer 320.

In the electronic apparatus 1000, at least one of the metal plate CS, the insulating layer TP, and the step difference compensation member AS may be omitted, and the electronic apparatus 1000 should not be particularly limited.

Figure 4A:
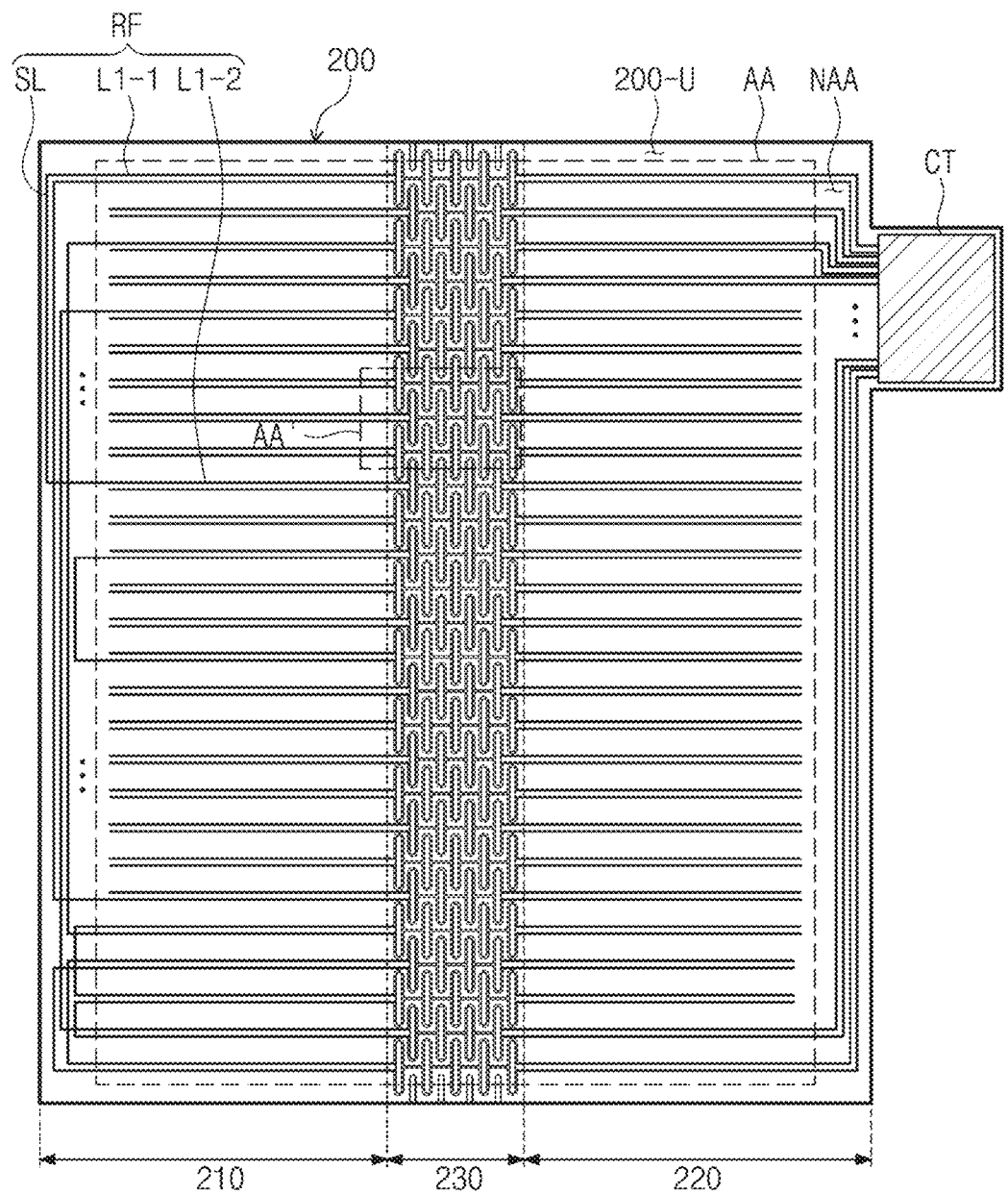
FIG. 4A is a plan view of a digitizer according to an embodiment of the present disclosure.
Figure 4B:
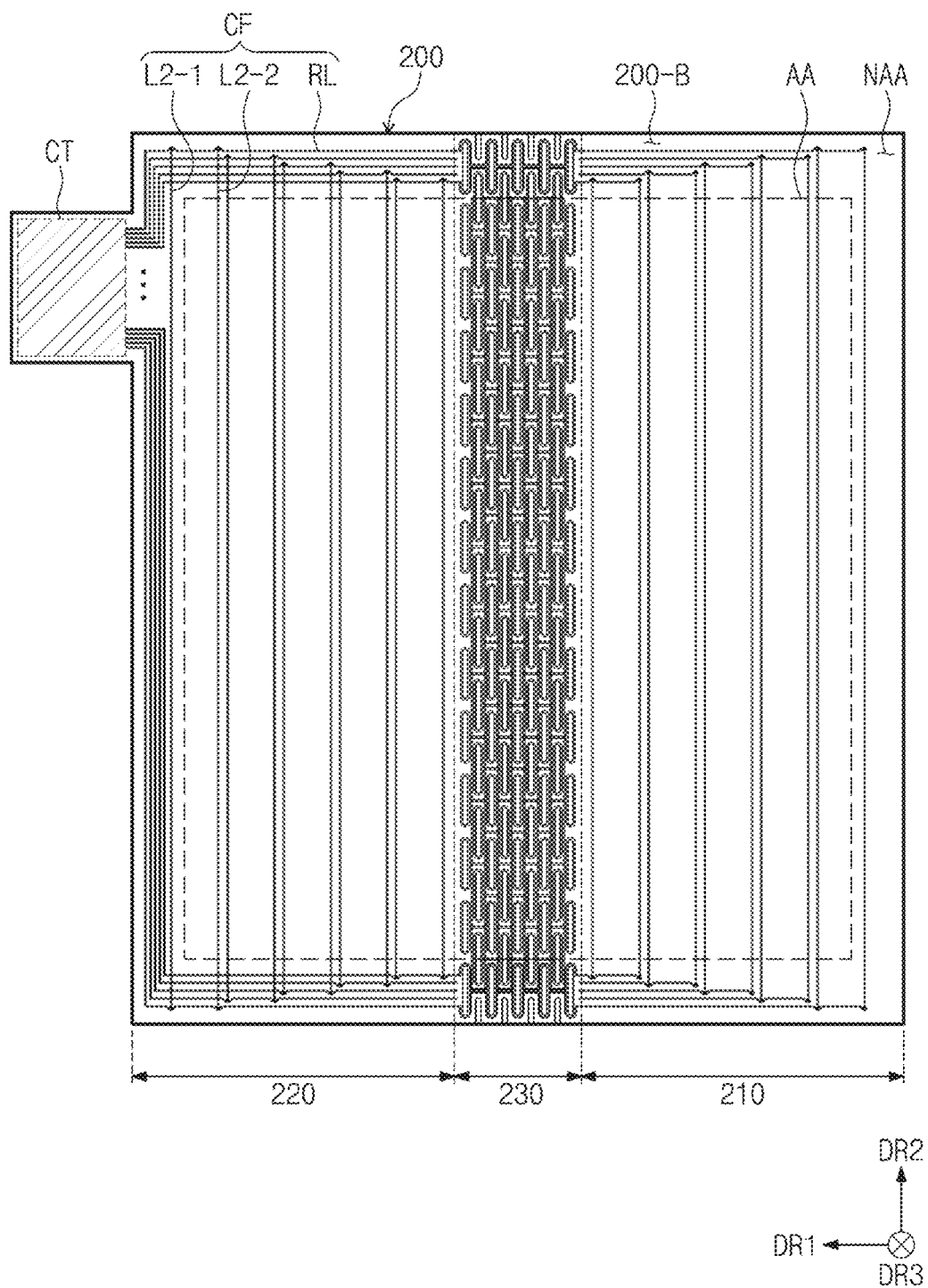
FIG. 4B is a rear view of a digitizer according to an embodiment of the present disclosure.
Figure 5:
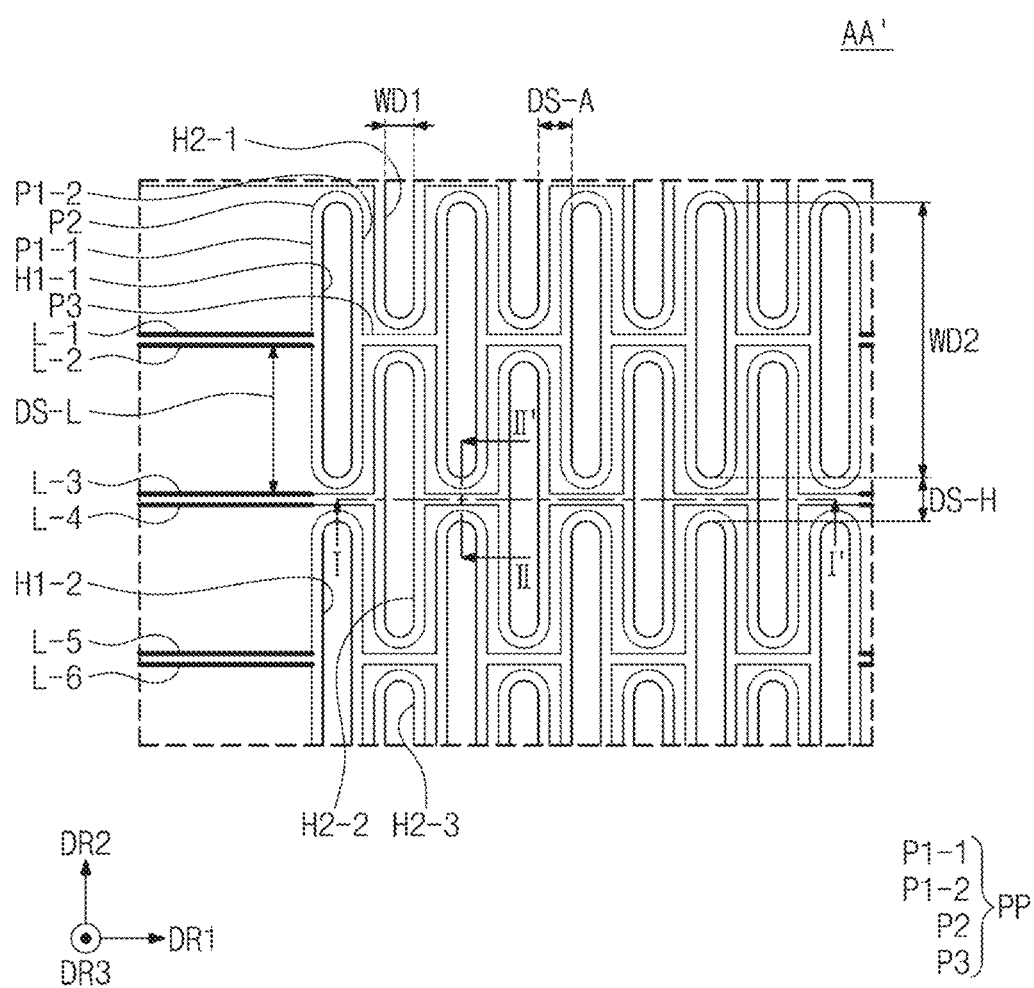
FIG. 5 is an enlarged plan view of an area AA' of FIG. 4A.
Figure 6A:
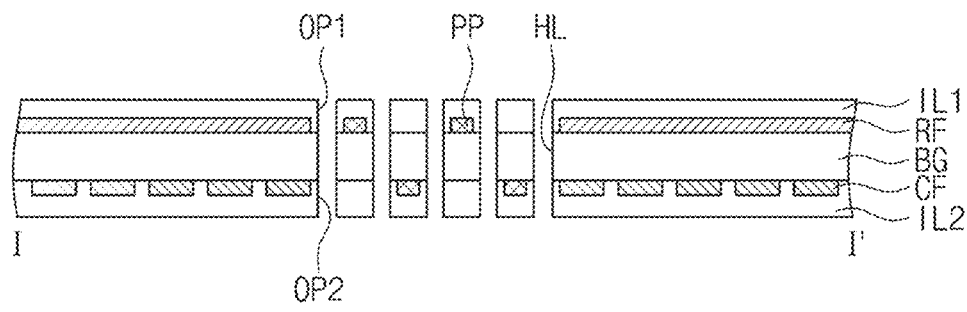
FIG. 6A is a cross-sectional view taken along line I-I' of FIG. 5.
Figure 6A:
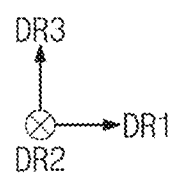
Figure 6B:
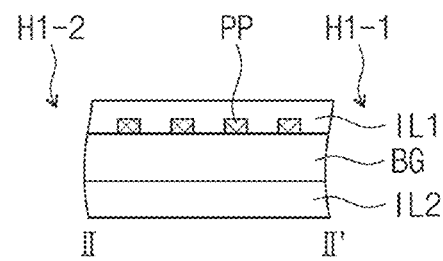
FIG. 6B is a cross-sectional view taken along line II-II' of FIG. 5.
Figure 6B:
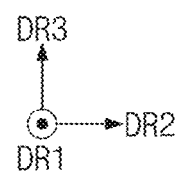
Figure 7A:
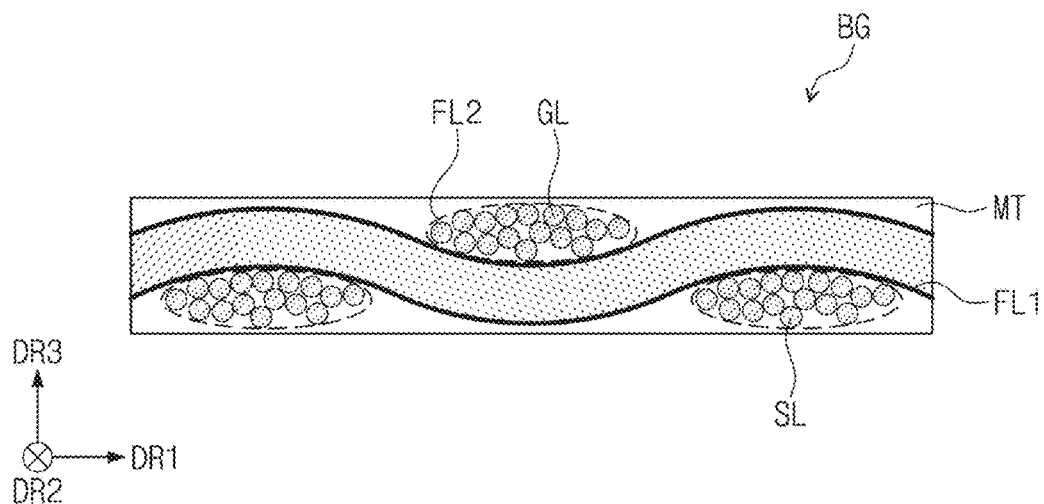
FIG. 7A is a cross-sectional view of a base layer according to an embodiment of the present disclosure.
Figure 7B:
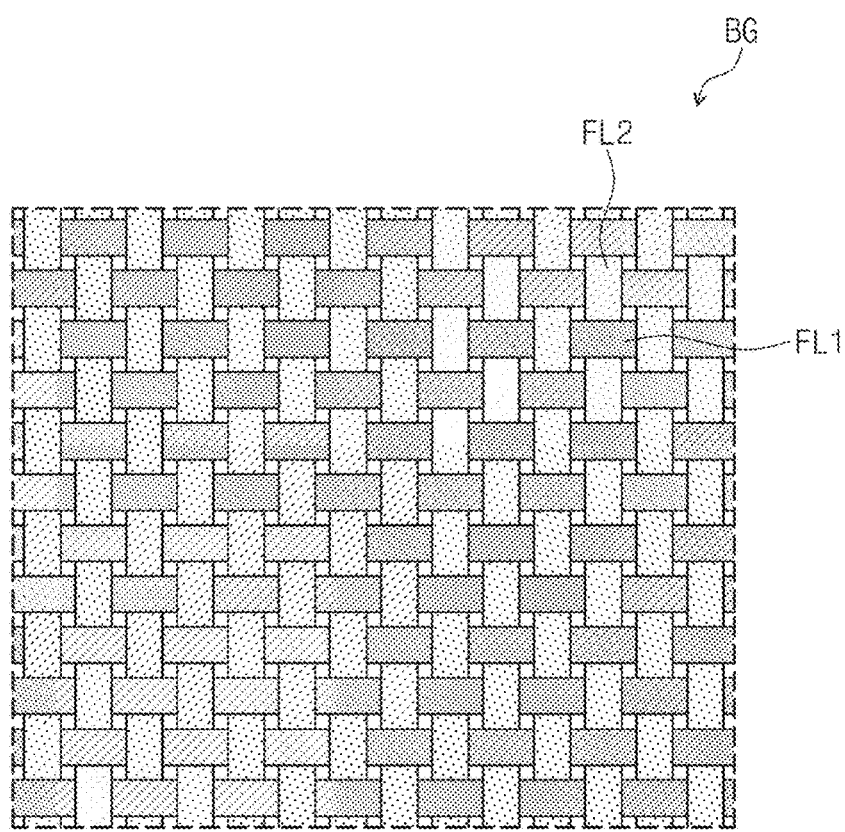
FIG. 7B is a plan view of a base layer according to an embodiment of the present disclosure.

FIG. 4A is a plan view of a digitizer according to an embodiment of the present disclosure, and FIG. 4B is a rear view of the digitizer according to an embodiment of the present disclosure. FIG. 5 is an enlarged plan view of an area AA' of FIG. 4A. FIG. 6A is a cross-sectional view taken along line I-I' of FIG. 5, and FIG. 6B is a cross-sectional view taken along line II-IF of FIG. 5. FIG. 7A is a cross-sectional view of a base layer BG according to an embodiment of the present disclosure, and FIG. 7B is a plan view of the base layer BG according to an embodiment of the present disclosure.

FIG. 4A shows sensing coils disposed on a front surface 200-U of the digitizer 200, and FIG. 4B shows sensing coils disposed on a rear surface 200-B of the digitizer 200.

Referring to FIGS. 4A and 4B, the digitizer 200 may include an active area AA and a peripheral area NAA. The active area AA may be defined as an area in which an input generated by a pen is sensed, and the peripheral area NAA may be defined as an area in which connection lines allowing each of the sensing coils RF and CF to form a loop may be arranged. The digitizer 200 may include the sensing coils RF and CF and a connector CT.

Each of the first sensing coils RF may include first and second long sides L1-1 and L1-2 extending in the first direction DR1 and a short side SL extending in the second direction DR2. The short side SL may connect first ends of the first and second long sides L1-1 and L1-2 spaced apart from each other in the second direction DR2 to each other.

The short sides SL may have different lengths from each other in the second direction DL2. Accordingly, widths in the second direction DR2 between the first and second long sides L1-1 and L1-2 included in the first sensing coils RF may vary, however, they should not be limited thereto or thereby. According to another embodiment, the short sides SL may have substantially the same length in the second direction DL2, and the first sensing coils RF each of which forms one loop may be spaced apart from each other.

A portion of the first and second long sides L1-1 and L1-2, which crosses the folding portion 230, may extend from the first non-folding portion 210 to the second non-folding portion 220 via the holes HL. This will be described in detail later.

According to an embodiment, the first and second long sides L1-1 and L1-2 may be disposed on a layer different from the short side SL. As an example, the short side SL may be disposed on the same layer as the second sensing coils CF.

One ends of each of the first sensing coils RF extending to the peripheral area NAA may be connected to the connector CT.

Each of the second sensing coils CF may include third and fourth long sides L2-1 and L2-2 extending in the second direction DR2 and a routing line RL extending in the first direction DR1 and connecting one ends of the third and fourth long sides L2-1 and L2-2 spaced apart from each other in the first direction DR1.

Among the third and fourth long sides L2-1 and L2-2, lines disposed in the folding portion 230 may be disposed between hole groups arranged in the second direction DR2 and spaced apart from each other in the first direction DR1. In addition, a line of the routing line RL, which is disposed in the folding portion 230, may be connected to the one end of each of the third and fourth long sides L2-1 and L2-2 after passing through between the holes HL.

One ends of each of the second sensing coils CF extending to the peripheral area NAA may be connected to the connector CT.

In the present embodiment, the second sensing coils CF may be referred to as driving coils, and the first sensing coils RF may be referred to as sensing coils, however, they should not be limited thereto or thereby. According to an embodiment, the second sensing coils CF may be referred to as the sensing coils, and the first sensing coils RF may be referred to as the driving coils. When a current flows through the second sensing coils CF, a magnetic force line may be induced between the second sensing coils CF and the first sensing coils RF. The first sensing coils RF may sense an induced electromagnetic force emitted from the electromagnetic pen and may output the sensed electromagnetic force to one terminal of each of the first sensing coils RF as a sensing signal. The one terminal of each of the first sensing coils RF may be connected to signal lines arranged in the peripheral area NAA.

Referring to FIG. 5, each of the holes HL defined through the folding portion 230 may have a first width WD1 in the first direction DR1. The first width WD1 may be equal to or greater than about 0.1 millimeters (mm) and equal to or smaller than about 0.5 mm. Each of the holes HL may have a second width WD2 in the second direction DR2. The second width WD2 may be equal to or greater than about 4 mm and equal to or smaller than about 10 mm.

In the present embodiment, the holes HL may include a first hole group and a second hole group. As an example, the first hole group may include a first-first hole H1-1 and a first-second hole H1-2, which are arranged in the second direction DR2. The second hole group may be spaced apart from the first hole group in the first direction DR1 and may include a second-first hole H2-1, a second-second hole H2-2, and a second-third hole H2-3, which are arranged in the second direction DR2.

In the present embodiment, the second hole group may be disposed shifted to the second direction DR2 from a position of the first hole group by a predetermined distance. According to an embodiment, the shifted distance may be smaller than a half of the second width WD2. Accordingly, a remaining portion of the folding portion 230 except for the holes HL may have a slit shape of a grid pattern.

According to the present embodiment, among the holes included in different hole groups a first separation distance DS-A between holes overlapping each other in the first direction DR1, for example, the first separation distance DS-A in the first direction DR1 between the first-first hole H1-1 of the first hole group and the second-first hole H2-1 of the second hole group, may be equal to or greater than about 0.1 mm and equal to or smaller than about 0.3 mm.

Among the holes included in the same hole group, a second separation distance DS-H in the second direction DR2 between the holes HL adjacent to each other in the second direction DR2, for example, the second separation distance DS-H in the second direction DR2 between the first-first hole H1-1 and the first-second hole H1-2 included in the first hole group, may be equal to or greater than about 0.1 mm and equal to or smaller than about 0.3 mm.

In addition, a separation distance DS-L in the second direction DR2 between a second coil L-2 and a third coil L-3 may be equal to or smaller than a half of a sum of the second width WD2 and the second separation distance DS-H.

Among the first sensing coils RF, each of the first sensing coils RF arranged in the folding portion 230 may include a pattern portion PP. The pattern portion PP may cross between the holes HL. The pattern portion PP may be provided in plural to one first sensing coil RF, and the pattern portions PP may be arranged along the second direction DR2.

According to an embodiment, the pattern portion PP may include first patterns P1-1 and P1-2, a second pattern P2, and a third pattern P3.

The first patterns P1-1 and P1-2 may extend in the second direction DR2 and may be spaced apart from each other with a corresponding hole HL interposed therebetween in the first direction DR1. The second pattern P2 may be connected to one end of each of the first patterns P1-1 and P1-2 to connect the first patterns P1-1 and P1-2 to each other.

In the present embodiment, the second pattern P2 may have a predetermined curvature corresponding to an edge of the hole HL. The third pattern P3 may be connected to the other end of a first-second pattern P1-2 and the other end of a first-first pattern P1-1 included in another pattern portion PP of the same first sensing coil RF. Accordingly, in one first sensing coil RF, the pattern portions PP disposed in the folding portion 230 may be provided between the holes HL.

FIG. 5 shows coils L-1, L-2, L-3, L-4, L-5, and L-6 forming different loops from each other among the first sensing coils RF as a representative example.

According to the present embodiment, portions included in different first sensing coils RF, respectively, may be disposed between two holes adjacent to each other in the second direction DR2 among the holes HL included in the same hole group.

As an example, a portion (second pattern) of the second coil L-2, a portion (third pattern) of the third coil L-3, a portion (third pattern) of a fourth coil L-4, and a portion (second pattern) of a fifth coil L-5 may be disposed between the first-first hole H1-1 and the first-second hole H1-2 of the first hole group (See FIG. 6B).

As an example, portions (the pattern portion PP) of the first sensing coils RF, which form four different loops, may be disposed between the holes H1-1 and H1-2 adjacent to each other in the second direction DR2 among the holes HL included in the same hole group as shown in FIG. 6B.

According to an embodiment, a first line width of the coils disposed in the first and second non-folding portions 210 and 220 among the first sensing coils RF may be greater than a second line width of the coils (pattern portion PP) disposed in the folding portion 230 among the first sensing coils RF. The first line width may be equal to or greater than about 200 micrometers (μm) and equal to or smaller than about 400 μm, and the second line width may be equal to or greater than about 30 μm and equal to or smaller than about 60 μm.

Referring to FIGS. 6A and 6B, the digitizer 200 may include the base layer BG, the first and second sensing coils RF and CF disposed on opposite surfaces (i.e., front surface, rear surface) of the base layer BG, respectively, and a first insulating layer IL1 and a second insulating layer IL2, which are disposed on the base layer BG to cover the first and second sensing coils RF and CF, respectively.

The holes HL defined through the folding portion 230 of the digitizer 200 may be formed penetrating through the base layer BG from a front surface to a rear surface of the base layer BG.

The first insulating layer IL1 may be disposed on the front surface of the digitizer 200 and may cover the first sensing coils RF. The first insulating layer IL1 may be provided with first openings OP1 formed therethrough to correspond to the holes HL.

The second insulating layer IL2 may be disposed on the rear surface of the digitizer 200 and may cover the second sensing coils CF. The second insulating layer IL2 may be provided with second openings OP2 formed therethrough to correspond to the holes HL.

As the first openings OP1, the holes HL, and the second openings OP2 are formed through the same process, the first openings OP1, the holes HL, and the second openings OP2, which correspond to each other, may be aligned with each other in the third direction DR3.

According to the present embodiment, the first and second insulating layers IL1 and IL2 may have a predetermined color. As an example, the first and second insulating layers IL1 and IL2 may have a black color. The first and second insulating layers IL1 and IL2 may be formed by coating an insulating material containing a dye and a pigment on the base layer BG. Each of the first and second insulating layers IL1 and IL2 may include a single inorganic layer or plural inorganic layers or a single organic layer or plural organic layers, however, it should not be limited thereto or thereby.

Referring to FIGS. 7A and 7B, the base layer BG may include a matrix portion MT including fillers and fiber lines FL1 and FL2 having a weave pattern and disposed inside the matrix portion MT. The fiber lines FL1 and FL2 may include a glass fiber reinforced plastic ("GFRP"). The base layer BG has a flexural modulus equal to or greater than about 10 gigapascals (GPa) and equal to or smaller than about 50 GPa.

Each of the fiber lines FL1 and FL2 may be provided in the form of a bundle of a plurality of glass fibers GL. Each glass fiber GL may have a diameter equal to or greater than about 3 μm and equal to or smaller than about 10 μm.

The fiber lines FL1 may extend in the first direction DR1 and be arranged in the second direction DR2, and the fiber lines FL2 may extend in the second direction DR2 and be arranged in the first direction DR1. The fiber lines FL1 may be interlaced with the fiber lines FL2 and thus, the fiber lines FL1 and FL2 may have a weave pattern when viewed in a plane (i.e., plan view).

The fiber lines FL1 and FL2 may be disposed in the matrix portion MT. The matrix portion MT may include at least one of epoxy, polyester, polyamides, polycarbonates, polypropylene, polybutylene, and vinyl ester.

The matrix portion MT may include the filler. The filler may include at least one of silica, barium sulphate, sintered talc, barium titanate, titanium oxide, clay, alumina, mica, boehmite, zinc borate, and zinc tinate.

Since the digitizer 200 (refer to FIG. 2) includes the holes HL (refer to FIG. 3) defined through the folding portion 230 (refer to FIG. 2), the shape of the electronic apparatus 1000 may be easily changed when the electronic apparatus 1000 (refer to FIG. 1A) is folded. The digitizer 200 may include the pattern portion PP (refer to FIG. 5) disposed between the holes HL of the folding portion 230, and thus, the digitizer 200 may be provided in an integral shape. In addition, the base layer BG of the digitizer 200 may include the fiber bundle of glass fiber reinforced plastic provided inside the matrix portion MT, and thus, the lower portion of the display module 100 (refer to FIG. 2) may be protected when the electronic apparatus 1000 (refer to FIG. 1A) is folded.

Accordingly, the digitizer 200 may perform the function of the protective member and the function of the sensing member. Therefore, a separate metal plate used to protect the display module 100 may be omitted, and a digitizer separately disposed on the folding portion 230 may be omitted. Thus, a manufacturing cost of the electronic apparatus 1000 may be reduced, and the electronic apparatus 1000 may become slim.

Figure 8:
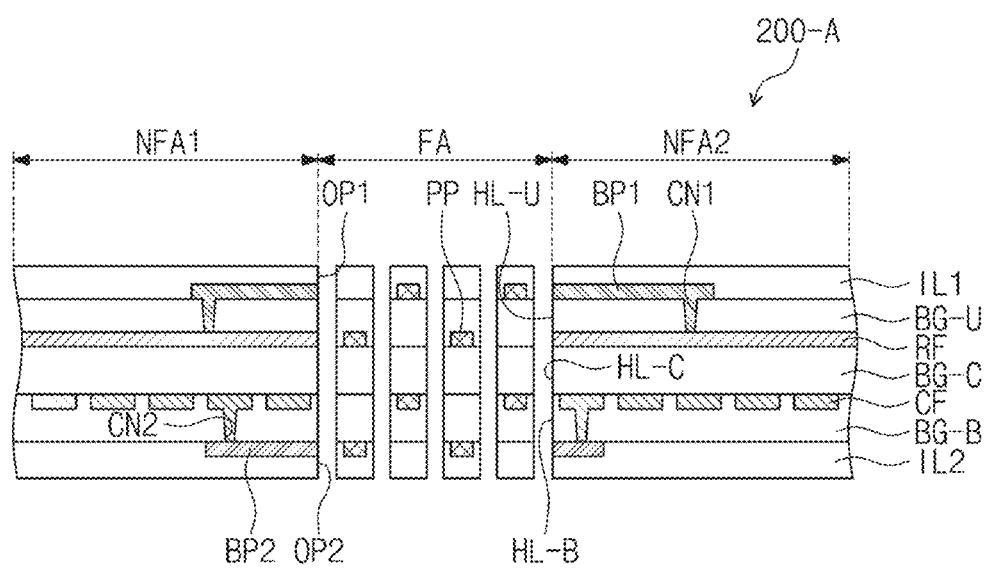
FIG. 8 is a cross-sectional view of a digitizer according to an embodiment of the present disclosure.

FIG. 8 is a cross-sectional view of a digitizer 200-A according to an embodiment of the present disclosure. In FIG. 8, the same reference numerals denote the same elements in FIGS. 3 to 7B, and thus, detailed descriptions of the same elements will be omitted.

Referring to FIG. 8, the digitizer 200-A may include a plurality of base layers BG-C, BG-U, and BG-B, first and second sensing coils RF and CF, and first and second insulating layers IL1 and IL2. In addition, the digitizer 200-A may include first and second bridge lines BP1 and BP2.

Each of the base layers BG-C, BG-U, and BG-B may include a matrix portion MT and fiber lines FL1 and FL2 disposed in the matrix portion MT, which are described with reference to FIGS. 7A and 7B.

The first sensing coils RF and the second sensing coils CF may be respectively disposed on a front surface and a rear surface of an intermediate layer BG-C. The intermediate layer BG-C may be provided with intermediate holes HL-C defined therethrough.

An upper layer BG-U may be disposed on the front surface of the intermediate layer BG-C and may cover the first sensing coils RF. The first bridge line BP1 may be disposed on the upper layer BG-U and may be covered by the first insulating layer IL1. The upper layer BG-U may be provided with upper holes HL-U defined therethrough.

The first bridge line BP1 may be connected to the first sensing coils RF via a first bridge contact hole CN1 defined through the upper layer BG-U.

A lower layer BG-B may be disposed on the rear surface of the intermediate layer BG-C and may cover the second sensing coils CF. The second bridge line BP2 may be disposed on the lower layer BG-B and may be covered by the second insulating layer IL2. The lower layer BG-B may be provided with lower holes HL-B defined therethrough.

Since the holes HL-C, HL-U, and HL-B are formed through the same process, the holes HL-C, HL-U, and HL-B may be aligned with each other in the third direction DR3.

The second bridge line BP2 may be connected to the second sensing coils CF via a second bridge contact hole CN2 defined through the lower layer BG-B.

In a case where the number of lines arranged between holes adjacent to each other in the second direction DR2 among the holes HL-C, HL-U, and HL-B included in the same hole group described with reference to FIG. 5 is five or more, any one pattern of the digitizer 200-A may be disposed on the upper layer BG-U or the lower layer BG-B via the bridge lines BP1 and BP2 to be connected to corresponding sensing coils.

Accordingly, the number of the coils disposed between the holes HL-C, HL-U, and HL-B may increase, and thus, a sensing capability of the digitizer 200-A may be improved.

FIGS. 9A to 9F are cross-sectional views of a method of manufacturing the digitizer 200 according to an embodiment of the present disclosure. FIGS. 9A to 9F are cross-sectional views of a method of manufacturing the digitizer 200 described with reference to FIGS. 6A and 6B. In FIGS. 9A to 9F, the same reference numerals denote the same elements in FIGS. 3 to 7B, and thus, detailed descriptions of the same elements will be omitted.

Figure 9A:
FIGS. 9A to 9F are cross-sectional views of a method of manufacturing a digitizer according to an embodiment of the present disclosure.

Referring to FIG. 9A, the manufacturing method of the digitizer may include forming a first conductive layer RF on the front surface of the base layer BG and forming a second conductive layer CF on the rear surface of the base layer BG. The first conductive layer RF and the second conductive layer CF may include copper.

Figure 9B:

Referring to FIG. 9B, the conductive layers RF and CF may be patterned.

The first conductive layer RF may be patterned to form the first sensing coils RF, and the second conductive layer CF may be patterned to form the second sensing coils CF. The first sensing coils RF and the second sensing coils CF may be arranged to correspond to the arrangement of the first sensing coils RF and the second sensing coils CF described with reference to FIGS. 4A and 4B and may have the shape corresponding to a shape of the first sensing coils RF and the second sensing coils CF described with reference to FIGS. 4A and 4B.

Figure 9C:
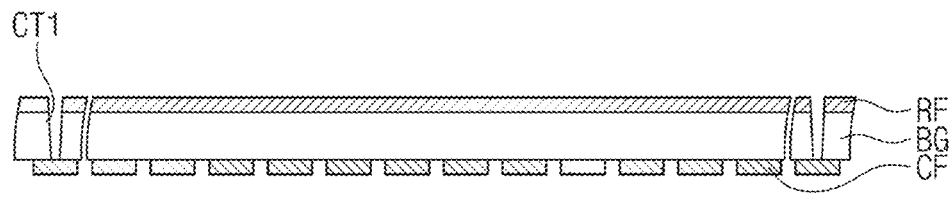

Referring to FIG. 9C, a contact hole CT1 may be formed through the base layer BG. The contact hole CT1 may be formed to penetrate the base layer BG from the front surface and the rear surface of the base layer BG. The contact hole CT1 may be defined in the peripheral area NAA shown in FIG. 4A.

Figure 9D:
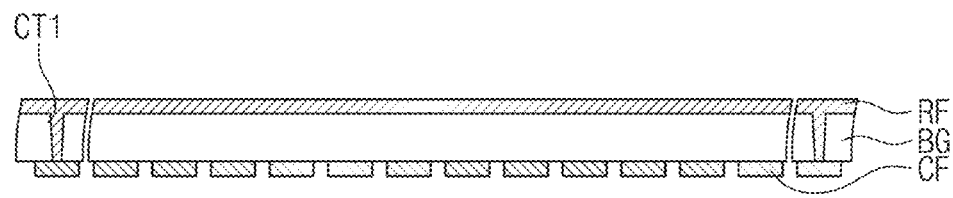

Referring to FIG. 9D, the first sensing coils RF may be plated. As the first sensing coils RF are plated, the contact hole CT1 may be filled with a metal material. Accordingly, some of the coils disposed on the front surface of the base layer BG among the coils arranged in the peripheral area NAA may be connected to the coils disposed on the rear surface of the base layer BG.

The connection of the first sensing coils RF via the contact hole CT1 may correspond to the connection relationship between the first and second long sides L1-1 and L1-2 to the short side SL described with reference to FIG. 4A. That is, the short side SL may be disposed on the rear surface of the base layer BG and may be connected to the one end of each of the first and second long sides L1-1 and L1-2 via the contact hole CT1.

Figure 9E:
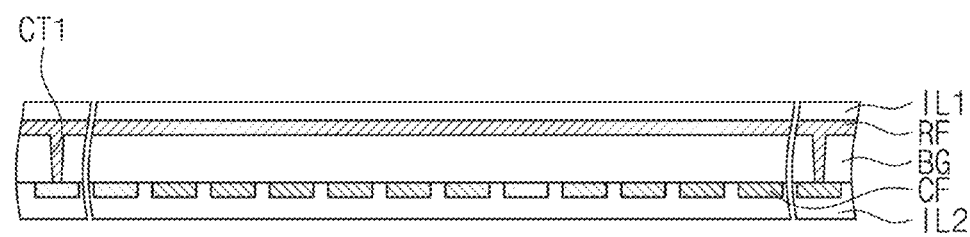

Referring to FIG. 9E, the insulating layers IL1 and IL2 may be formed on the base layer BG. The first insulating layer IL1 may be formed on the front surface of the base layer BG and may cover the first sensing coils RF. The second insulating layer IL2 may be disposed on the rear surface of the base layer BG and may cover the second sensing coils CF. The insulating layers IL1 and IL2 may have a black color. The insulating layers IL1 and IL2 may be formed by coating the insulating material including the dye and/or the pigment on the base layer BG.

Figure 9F:
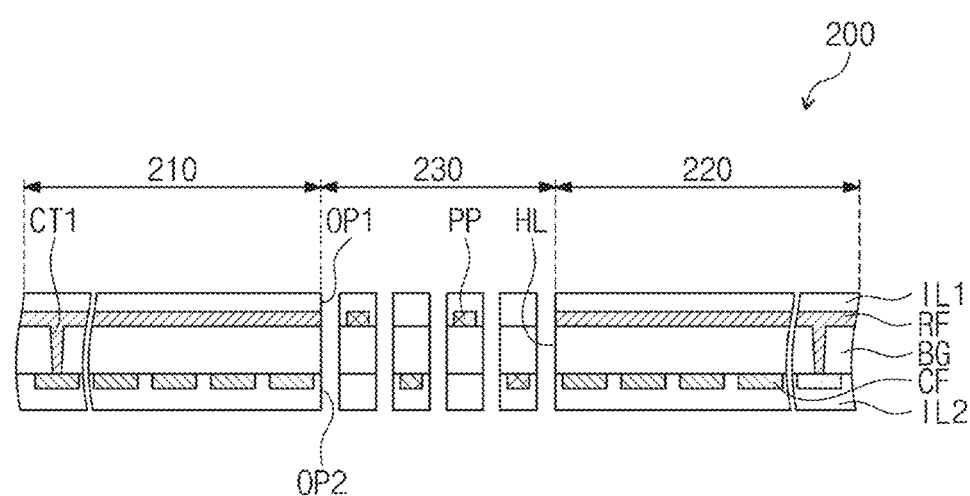

Referring to FIG. 9F, the holes HL may be formed through the base layer BG. The insulating layers IL1 and IL2 may be removed in the process of forming the holes HL, and thus, the openings OP1 and OP2 may be formed through the insulating layers IL1 and IL2 to correspond to the holes HL.

Accordingly, the holes HL and the openings OP1 and OP2 corresponding to the holes HL may be aligned with each other in the third direction DR3.

According to the present disclosure, the digitizer 200 may include the folding portion 230 through which the holes HL are formed and the first and second non-folding portions 210 and 220 spaced apart from each other with the folding portion 230 interposed therebetween.

FIGS. 10A to 10H are cross-sectional views of a method of manufacturing the digitizer 200-A according to an embodiment of the present disclosure. FIGS. 10A to 10H are cross-sectional views of a method of manufacturing the digitizer 200-A described with reference to FIG. 8. In FIGS. 10A to 10H, the same reference numerals denote the same elements in FIGS. 3 to 8, and thus, detailed descriptions of the same elements will be omitted.

Figure 10A:
FIGS. 10A to 10H are cross-sectional views of a method of manufacturing a digitizer according to an embodiment of the present disclosure.

Referring to FIG. 10A, the manufacturing method of the digitizer may include forming a first conductive layer RF on the front surface of the intermediate layer BG-C and forming a second conductive layer CF on the rear surface of the intermediate layer BG-C. The first conductive layer RF and the second conductive layer CF may include copper. The intermediate layer BG-C may correspond to the intermediate layer BG-C described with reference to FIG. 8.

Figure 10B:
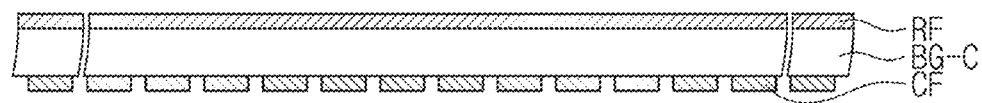

Referring to FIG. 10B, the conductive layers RF and CF may be patterned.

The first conductive layer RF may be patterned to form the first sensing coils RF, and the second conductive layer CF may be patterned to form the second sensing coils CF. The first sensing coils RF and the second sensing coils CF may be arranged to correspond to the arrangement of the first sensing coils RF and the second sensing coils CF described with reference to FIGS. 4A and 4B and may have the shape corresponding to a shape of the first sensing coils RF and the second sensing coils CF described with reference to FIGS. 4A and 4B.

Figure 10C:
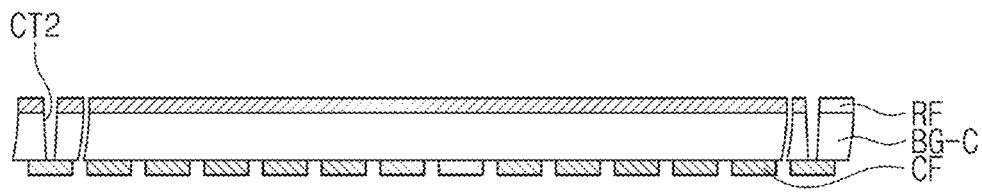

Referring to FIG. 10C, a contact hole CT2 may be formed through the intermediate layer BG-C. The contact hole CT2 may be formed to penetrate the intermediate layer BG-C from the front surface and the rear surface of the intermediate layer BG-C. The contact hole CT2 may be defined in the peripheral area NAA shown in FIG. 4A.

Figure 10D:
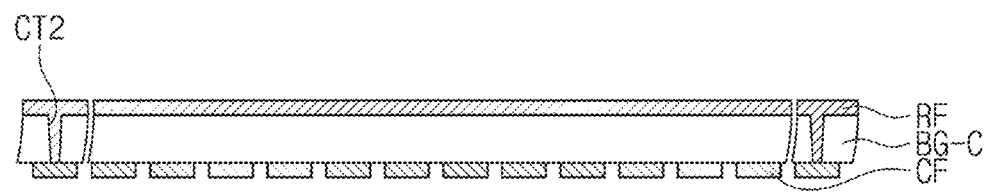

Referring to FIG. 10D, the first sensing coils RF may be plated. As the first sensing coils RF are plated, the contact hole CT2 may be filled with a metal material. Accordingly, some of the coils disposed on the front surface of the intermediate layer BG-C among the coils arranged in the peripheral area NAA may be connected to the coils disposed on the rear surface of the intermediate layer BG-C.

The connection of the first sensing coils RF via the contact hole CT2 may correspond to the connection relationship between the first and second long sides L1-1 and L1-2 to the short side SL described with reference to FIG. 4A. That is, the short side SL may be disposed on the rear surface of the intermediate layer BG-C and may be connected to the one end of each of the first and second long sides L1-1 and L1-2 via the contact hole CT2.

Figure 10E:
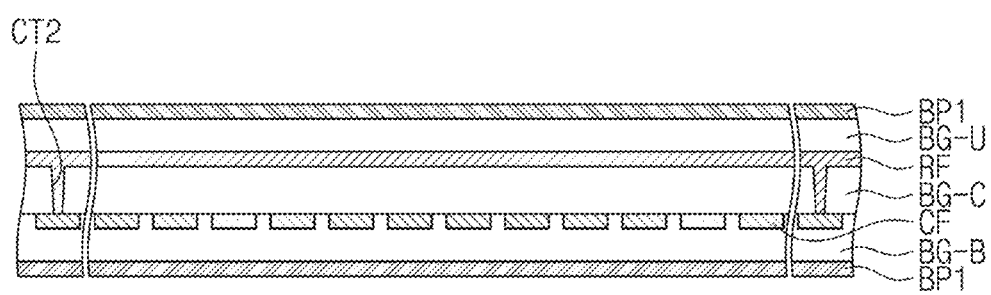

Referring to FIG. 10E, the upper layer BG-U may be formed above the front surface of the intermediate layer BG-C, a third conductive layer BP1' may be formed on the front surface of the upper layer BG-U, the lower layer BG-B may be formed above the rear surface of the intermediate layer BG-C, and a fourth conductive layer BP2' may be formed on the rear surface of the lower layer BG-B. The upper layer BG-U and the lower layer BG-B may correspond to the upper layer BG-U and the lower layer BG-B described with reference to FIG. 8.

Figure 10F:
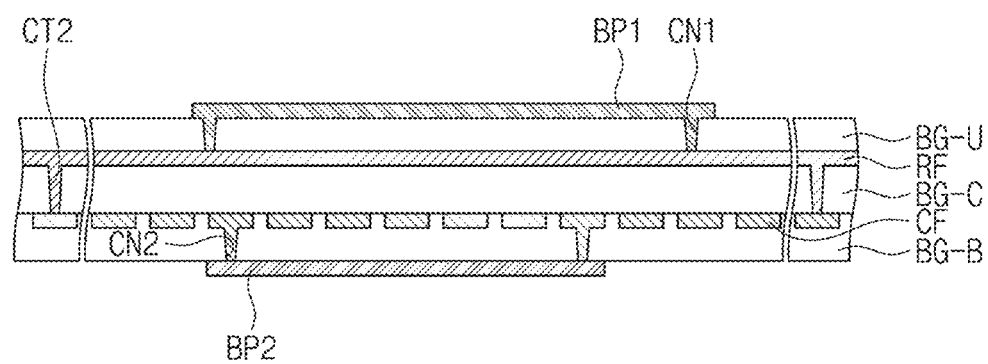

Referring to FIG. 10F, the conductive layers BP1 and BP2 may be patterned, and the bridge contact hole CN1 and CN2 may be formed.

The third conductive layer BP1' may be patterned to form the first bridge line BP1, and the fourth conductive layer BP2' may be patterned to form the second bridge line BP2.

The first sensing coils RF may be connected to the first bridge line BP1 via the first bridge contact hole CN1, and the second sensing coils CF may be connected to the second bridge line BP2 via the second bridge contact hole CN2.

In a case where the number of lines arranged between holes adjacent to each other in the second direction DR2 among the holes HL included in the same hole group described with reference to FIG. 5 is five or more, any one pattern of the digitizer 200-A may be disposed on the upper layer BG-U or the lower layer BG-B via the bridge lines BP1 and BP2 to be connected to corresponding sensing coils.

Figure 10G:
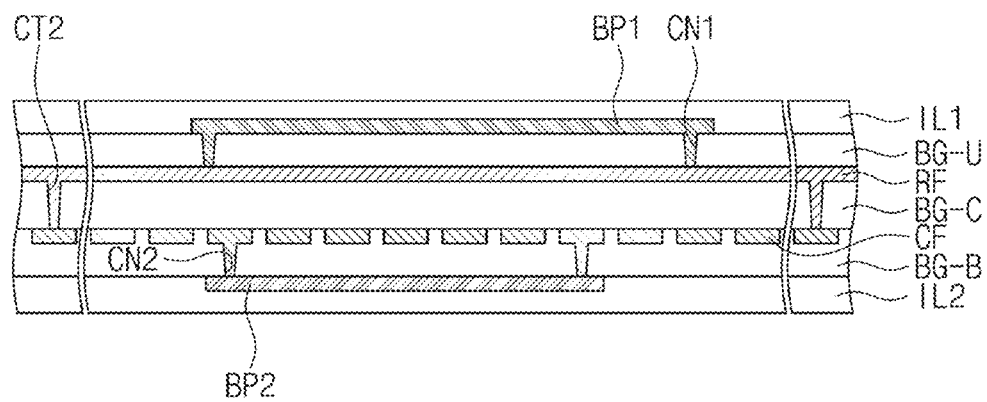

Referring to FIG. 10G, the first insulating layer IL1 may be formed on the front surface of the upper layer BG-U, and the second insulating layer IL2 may be formed on the rear surface of the lower layer BG-B. The first insulating layer IL1 may cover the first bridge line BP1. The second insulating layer IL2 may cover the second bridge line BP2. The insulating layers IL1 and IL2 may have a black color. The insulating layers IL1 and IL2 may be formed by coating the insulating material containing the dye and/or the pigment on the upper layer BG-U or the lower layer BG-B.

Figure 10H:
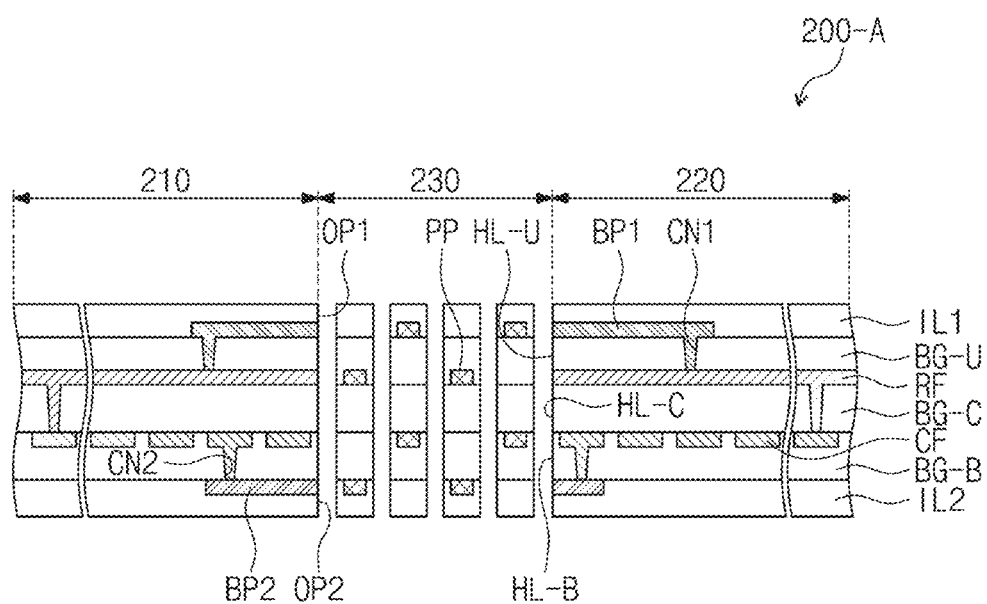

Referring to FIG. 10H, the holes HL-C, HL-U, and HL-B may be formed through the base layers BG-C, BG-U, and BG-B. Since the insulating layers IL1 and IL2 may be removed in the process of forming the holes HL-C, HL-U, and HL-B, the openings OP1 and OP2 may be formed through the insulating layers IL1 and IL2 to correspond to the holes HL-C, HL-U, and HL-B.

Accordingly, the holes HL-C, HL-U, and HL-B and the openings OP1 and OP2 corresponding to the holes HL-C, HL-U, and HL-B may be aligned with each other in the third direction DR3.

According to the present disclosure, the digitizer 200-A may include the folding portion 230 through which the holes HL-C, HL-U, and HL-B are formed and the first and second non-folding portions 210 and 220 spaced apart from each other with the folding portion 230 interposed therebetween.

Although the embodiments of the present disclosure have been described, it is understood that the present disclosure should not be limited to these embodiments but various changes and modifications can be made by one ordinary skilled in the art within the spirit and scope of the present disclosure as hereinafter claimed.

Therefore, the disclosed subject matter should not be limited to any single embodiment described herein, and the scope of the present invention shall be determined according to the attached claims.

What is claimed is:

1. An electronic apparatus comprising:
    a display panel comprising first and second non-folding areas arranged in a first direction and a folding area disposed between the first and second non-folding areas, wherein the folding area is foldable with respect to an imaginary folding axis extending in a second direction crossing the first direction;
    a panel protective layer disposed under the display panel;
    a digitizer disposed under the panel protective layer and comprising a base layer comprising a folding portion through which holes are defined to correspond to the folding area, a first non-folding portion, and a second non-folding portion spaced apart from the first non-folding portion with the folding portion interposed therebetween and sensing coils disposed on the base layer; and
    an adhesive layer comprising a first portion attaching the panel protective layer to the first non-folding portion and a second portion spaced apart from the first portion with the folding portion interposed therebetween and attaching the panel protective layer to the second non-folding portion,
    wherein the base layer comprises:
        a matrix portion comprising a filler; and
        fiber lines arranged in the matrix portion and having a weave pattern.

2. The electronic apparatus of claim 1, wherein portions of different sensing coils among the sensing coils are provided between two holes adjacent to each other among the holes.

3. The electronic apparatus of claim 1, wherein sensing coils disposed in the first and second non-folding portions among the sensing coils have a first line width equal to or greater than about 200 micrometers and equal to or smaller than about 400 micrometers, and sensing coils disposed in the folding portion among the sensing coils have a second line width equal to or greater than about 30 micrometers and equal to or smaller than about 60 micrometers.

4. The electronic apparatus of claim 1, wherein a first width in the first direction of each of the holes is equal to or greater than about 0.1 millimeters (mm) and equal to or smaller than about 0.5 mm, and a second width in the second direction of each of the holes is equal to or greater than about 4 mm and equal to or smaller than about 10 mm.

5. The electronic apparatus of claim 1, wherein a first separation distance between holes adjacent to each other among the holes in the first direction is equal to or greater than about 0.1 mm and equal to or smaller than about 0.3 mm, and a second separation distance between holes adjacent to each other among the holes in the second direction is equal to or greater than about 0.1 mm and equal to or smaller than about 0.3 mm.

6. The electronic apparatus of claim 1, wherein the sensing coils comprise:
    first sensing coils comprising first long sides each extending in the first direction in the first and second non-folding portions and first short sides extending in the second direction and connected to first ends or second ends of the first long sides; and
    second sensing coils insulated from the first sensing coils and comprising second long sides each extending in the second direction in the first and second non-folding portions and second short sides extending in the first direction and connected to first ends or second ends of the second long sides.

7. The electronic apparatus of claim 6, wherein a separation distance in the first and second non-folding portions in the second direction between two first long sides, which face each other among the first long sides of the first sensing coils and are disposed between two holes adjacent in the second direction among the holes, is equal to or smaller than a half of a sum of a width in the second direction of each of the holes and a separation distance between the holes adjacent to each other in the second direction among the holes.

8. The electronic apparatus of claim 6, wherein at least one of the first short sides penetrates through the base layer to be connected to the first long sides.

9. The electronic apparatus of claim 1, wherein a width in the first direction of the folding portion is equal to or greater than about 5 mm and equal to or smaller than about 20 mm.

10. The electronic apparatus of claim 1, wherein the holes comprise a first hole group and a second hole group, which extend in the second direction and are arranged spaced apart from each other in the first direction, and the second hole group is disposed shifted by a predetermined distance to the second direction from a position of the first hole group.

11. The electronic apparatus of claim 10, wherein the shifted distance is smaller than a half of a width in the second direction of each of the holes.

12. The electronic apparatus of claim 1, wherein each of the fiber lines comprises a plurality of glass fibers, and each glass fiber has a diameter equal to or greater than about 3 micrometers (μm) and equal to or smaller than about 10 μm.

13. The electronic apparatus of claim 1, wherein the matrix portion comprises at least one of epoxy, polyester, polyamides, polycarbonates, polypropylene, polybutylene, and vinyl ester, and the filler comprises at least one of silica, barium sulphate, sintered talc, barium titanate, titanium oxide, clay, alumina, mica, boehmite, zinc borate, and zinc tinate.

14. The electronic apparatus of claim 11, wherein sensing coils disposed in the first and second non-folding portions among the sensing coils have a first line width equal to or greater than about 200 micrometers and equal to or smaller than about 400 micrometers, and sensing coils disposed in the folding portion among the sensing coils have a second line width equal to or greater than about 30 micrometers and equal to or smaller than about 60 micrometers.

15. The electronic apparatus of claim 1, wherein the base layer is provided in plural, and the base layers are stacked in a thickness direction of the display panel.

16. The electronic apparatus of claim 15, wherein the base layers comprises an intermediate layer on which the sensing coils are disposed, an upper layer disposed on the intermediate layer, and a lower layer disposed under the intermediate layer,
wherein the digitizer further comprises a bridge line disposed on at least one of the upper layer and the lower layer, and the bridge line is connected to the sensing coils overlapping a place between holes adjacent to each other among the holes and overlapping therewith in a plan view after penetrating through one of the upper layer and the lower layer.

17. The electronic apparatus of claim 1, wherein the digitizer has a thickness equal to or greater than about 30 micrometers and equal to or smaller than about 300 micrometers.

18. The electronic apparatus of claim 1, wherein the base layer has a flexural modulus equal to or greater than about 10 gigapascals (Gpa) and equal to or smaller than about 50 GPa.

19. The electronic apparatus of claim 1, further comprising insulating layers disposed on a front surface and a rear surface of the base layer, covering the sensing coils, and provided with openings defined therethrough to correspond to the holes.

20. The electronic apparatus of claim 19, wherein the insulating layers comprise at least one of a pigment and a dye, which have a black color.

21. A digitizer comprising:
a base layer comprising a folding portion through which holes are defined, a first non-folding portion, and a second non-folding portion spaced apart from the first non-folding portion with the folding portion interposed therebetween in a first direction;
sensing coils disposed on the base layer; and
insulating layers disposed on a front surface and a rear surface of the base layer, covering the sensing coils, and provided with openings defined therethrough to correspond to the holes,
wherein portions of different sensing coils among the sensing coils are provided between two holes adjacent to each other among the holes.

22. The digitizer of claim 21, wherein, the base layer comprises:
a matrix portion comprising a filler; and
fiber lines arranged in the matrix portion and having a weave pattern.

23. The digitizer of claim 21, further comprising a shielding layer disposed under the base layer.

24. The digitizer of claim 21, wherein the sensing coils comprise:
first sensing coils comprising first long sides each extending in the first direction in the first and second non-folding portions and first short sides extending in a second direction and connected to first ends or second ends of the first long sides; and
second sensing coils insulated from the first sensing coils and comprising second long sides each extending in the second direction in the first and second non-folding portions and second short sides extending in the first direction and connected to first ends or second ends of the second long sides.

25. The digitizer of claim 24, wherein each of the first sensing coils overlapping the folding portion comprises:
first patterns extending in the second direction and spaced apart from each other with a corresponding opening interposed therebetween;
a second pattern connecting first ends of the first patterns; and
a third pattern connected to second ends of the first patterns opposite to the first ends.

26. The digitizer of claim 25, wherein the second pattern is disposed between two holes adjacent to each other in the second direction among the holes, and the third pattern is disposed between two holes adjacent to each other and entirely overlapping each other in the first direction among the holes.

27. The digitizer of claim 21, wherein a first width in the first direction of each of the holes is equal to or greater than about 0.1 mm and equal to or smaller than about 0.5 mm, and a second width in the second direction of each of the holes is equal to or greater than about 4 mm and equal to or smaller than about 10 mm.

28. The digitizer of claim 21, wherein a first separation distance between holes adjacent to each other among the holes in the first direction is equal to or greater than about 0.1 mm and equal to or smaller than about 0.3 mm, and a second separation distance between holes adjacent to each other among the holes in the second direction is equal to or greater than about 0.1 mm and equal to or smaller than about 0.3 mm.

29. The digitizer of claim 21, wherein a width in the first direction of the folding portion is equal to or greater than about 5 mm and equal to or smaller than about 20 mm.

30. The digitizer of claim 21, wherein sensing coils disposed in the first and second non-folding portions among the sensing coils have a first line width equal to or greater than about 200 micrometers and equal to or smaller than about 400 micrometers, and sensing coils disposed in the folding portion among the sensing coils have a second line width equal to or greater than about 30 micrometers and equal to or smaller than about 60 micrometers.

\* \* \* \* \*